United States Patent
Wason

(10) Patent No.: US 6,850,922 B1
(45) Date of Patent: Feb. 1, 2005

(54) BUSINESS LOGIC SUPPORT

(75) Inventor: James Richard Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 09/616,800

(22) Filed: Jul. 14, 2000

(51) Int. Cl.⁷ .............................................. G06F 15/18
(52) U.S. Cl. ...................................................... 706/47
(58) Field of Search .................................... 706/45–60

(56) References Cited

U.S. PATENT DOCUMENTS

| | | | |
|---|---|---|---|
| 5,832,268 A | * | 11/1998 | Anderson et al. ............ 719/316 |
| 5,862,325 A | * | 1/1999 | Reed et al. ................... 706/201 |
| 6,018,731 A | * | 1/2000 | Bertrand et al. .............. 706/47 |
| 6,018,732 A | * | 1/2000 | Bertrand et al. .............. 706/60 |

OTHER PUBLICATIONS

Agent Management Technology in a Ruled–Based Electronic Collaboration System, Technical Report (No. VIS-Lab.97002), Yong Mu (1997).*
Burst Error Correction Extensions for Reed Solomon Codes, Pat Owsley, 1988, Graduate School University of Idaho.*

* cited by examiner

Primary Examiner—Anthony Knight
Assistant Examiner—Michael B. Holmes
(74) Attorney, Agent, or Firm—Scully, Scott, Murphy & Presser; William E. Schiesser

(57) ABSTRACT

A mechanism to isolate and externalize the definition of business rules, and to support them using visual programming techniques (special editors for Java beans). This means that the rules can be set up by a business expert who does not need specialized programming skills. In addition, the Java beans are preferably implemented as dynamic Java beans.

14 Claims, 3 Drawing Sheets

Managing Business Rules for Data

1. Support for definition and evaluation of decision points.

2. Support for creation and implementation of business rules.

3. Support for reliable and consistent invocation of the business rules.

4. Support for both interactive and server side processing.

5. Isolation of business logic.

6. The ability to create business rules without writing Java code.

7. The ability to change business logic without recompiling and reinstalling the application.

Figure 3

BUSINESS LOGIC SUPPORT

CROSS REFERENCE TO COPENDING APPLICATIONS

The disclosure of this application is related to the disclosures of the following copending applications:

"Text File Interface Support In An Object Oriented Application," Ser. No. 09/616,809, filed Jul. 14, 2000; "Flexible Help Support In An Object Oriented Application," Ser. No. 09/616,808, filed Jul. 14, 2000; "Dynamic Java Beans For Visual Age For Java," Ser. No. 09/615,973, filed, Jul. 14, 2000; and "Complex Data Navigation, Manipulation And Presentation Support," Ser. No. 09/615,976, filed Jul. 14, 2000; the disclosures of the four above-identified copending applications are hereby incorporated herein by reference in their entireties.

BACKGROUND OF THE INVENTION

This invention generally relates to supporting business logic in computer applications. More specifically, the invention relates to methods and systems for managing and applying business rules for data used in computer applications.

Many applications include "business logic" as a part of the total function. This is in addition to application logic which is used to retrieve, present and store data; the "business logic" is usually in the form of extra constraints that are imposed on the data (beyond innate data integrity rules) to ensure that it is valid within that business application. The rules for the business logic are (at least from a programming point of view) more arbitrary than the core application logic. For example, a business rule might be that any new orders have to be at least 50 dollars in cost. This is in contrast to a base integrity rule that says that the order header must exist before the line items for that order can be added. Business logic also tends to change over time; frequently this is the major cause of updates to the application.

The traditional approach to this has been to write unique code to handle each business verification. Quite often, this code is intermingled with other code that is involved only with data presentation or storage. There are several problems associated to this approach:

1. It is difficult to find out just how a business rule has been implemented. The business logic may be totally mixed up with other processing so that it cannot be easily isolated and modified.
2. Since the business rules are coded in the same classes that are presenting the data, changing the rules means that many parts have to be changed. These changes may have unintended side effects because the business logic is not sufficiently isolated.
3. This limits the flexibility of the application and makes it hard to maintain.
4. Implementation of a business rule requires programming expertise. It cannot be done using visual programming techniques.
5. Changing a business rule requires changing the application code and reinstalling the application. This can be particularly annoying if the rules change frequently to adapt to changing business conditions.

If a rule is implemented in one place in the application, there is no way to verify that it will be invoked in all appropriate circumstances. Some parallel piece of application processing may also need the rule. If it is implemented twice to cover that situation, then there is no assurance that it will be found in both places when it needs to be modified.

SUMMARY OF THE INVENTION

An object of this invention is to provide a mechanism to isolate and externalize the definition of business rules.

Another object of the present invention is to support business rules using visual programming techniques.

A further object of this invention is to programming techniques to set up business rules and that can be used by a business expert who does not need specialized programming skills.

These and other objectives are attained by providing a mechanism to isolate and externalize the definition of business rules, and to support them using visual programming techniques (special editors for Java beans). This means that the rules can be set up by a business expert who does not need specialized programming skills. In addition, the Java beans are implemented as dynamic Java beans (see the above-identified copending application "Dynamic Java Beans for VisualAge for Java."

This means that the business rules can be adjusted by changing their initialization strings on a relational database, so that the rules can be modified without the need to recompile and reinstall the application. They can be altered by an administrator using the custom editors for the beans. Again, no knowledge of Java is needed to set up the rules. The underlying application environment (the Enterprise Application Development Platform—see the above-identified copending application A Complex Data Navigation, Manipulation And Presentation Support@) provides a consistent and reliable invocation of the business rules at predictable points of processing. Each rule can specify during which events (add, change, update, delete, etc.) it is to be invoked.

Of course, not all business logic will fall completely into the pattern provided by this invention. Another problem it solves is the ability to allow code exits (written in Java) to be invoked to call more complicated processing. These exits share in the isolation and reliable invocation of other business logic supported by this invention.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 shows the major elements of a preferred embodiment of the invention.

DETAILED DESCRIPTION OF THE PREFERRED EMBODIMENTS

Figure 1:
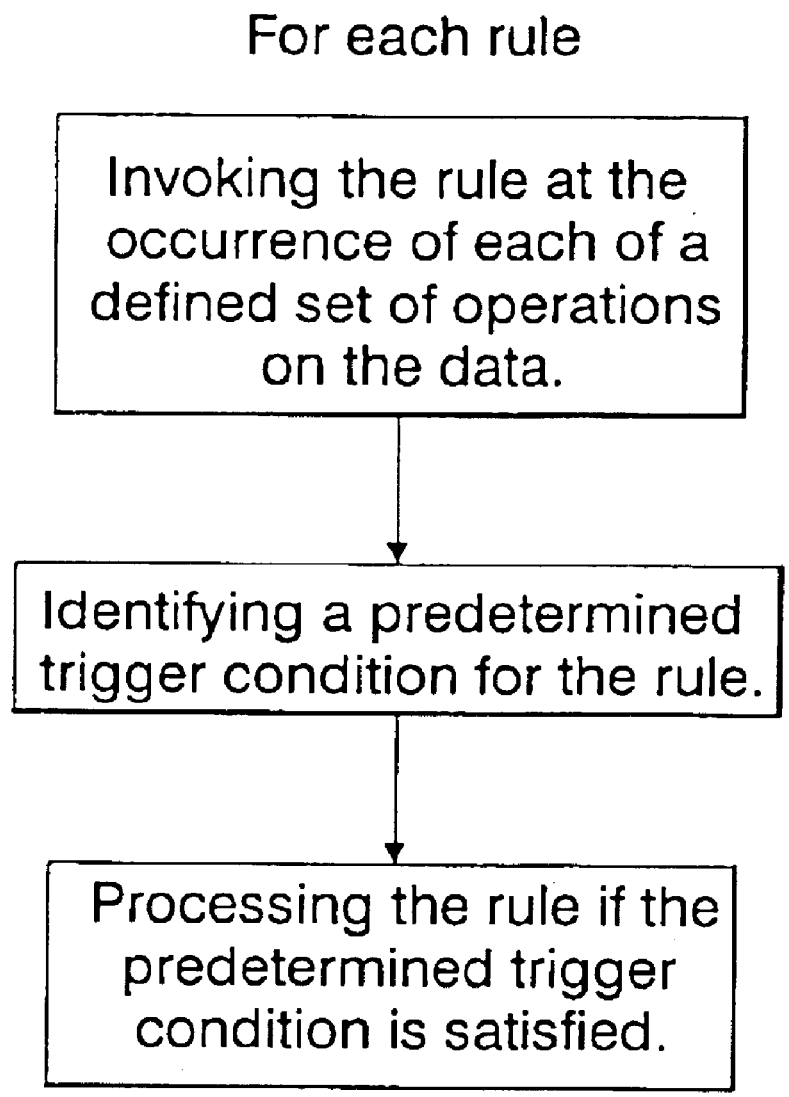
FIG. 1 is a flow chart outlining a method embodying this invention.

With reference to FIG. 1, a first aspect of this invention relates to a method for applying business rules to data. The method comprises the steps of, for each rule, invoking the rule at the occurrence of each of a defined set of operations on the data, and identifying a predetermined trigger condition for the rule. The rule is then processed if the predetermined trigger condition is satisfied.

Figure 2:
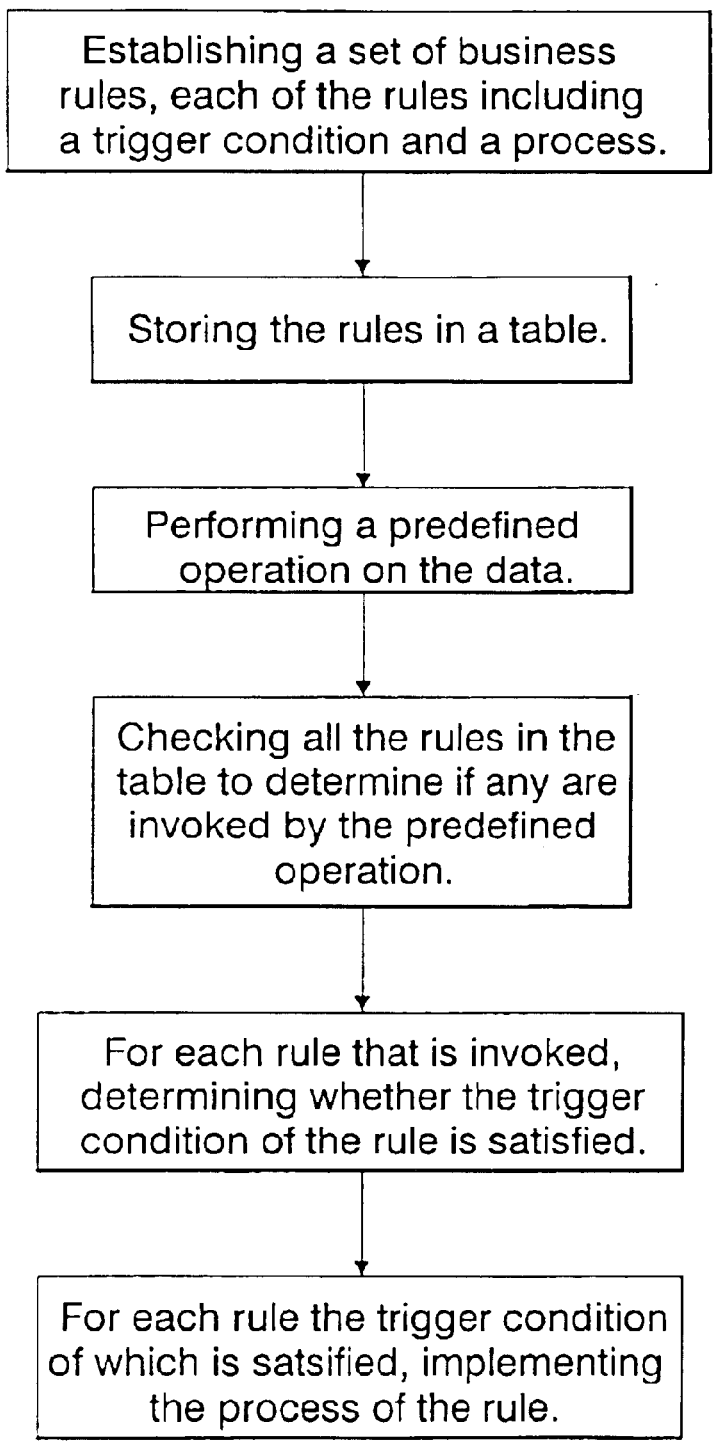
FIG. 2 is a flow chart illustrating a method embodying a second aspect of this invention.

As shown in FIG. 2, a second aspect of the invention relates to a method for managing business rules for data. This method includes the steps of establishing a set of business rules, where each of the rules includes a trigger condition and a process, and storing the rules in a table. When a predefined operation is performed on the data, all the rules in the table are checked to determine if any are invoked by the operation. The method comprises the further steps of, for each rule that is invoked, determining whether the trigger condition of the rule is satisfied; and for each rule having a trigger condition that is satisfied, implementing the process of the rule.

As generally outlined in FIG. 3, the preferred embodiment of the invention has the following major elements.

1. Support for Definition and Evaluation of Decision Points (These are Referred as Triggers).

A trigger is a decision point used to gate the invocation of a business rule. There are two types of triggers:

a. Simple Triggers

A simple trigger corresponds to a condition on one column of one row of one table (however the columns may be a quick view, computed, or derived columns as described in RSW8-2000-0007). This invention provides a custom editor for a Java bean property that allows the column and the data condition to be assigned.

b. Compound Triggers

These are made up of other simple or compound triggers, which are logically combined by AND or OR. Each subtrigger as it as added can be chosen to evaluate to TRUE or FALSE. Any logical structure can be built up this way; the only restriction is that it must be possible to evaluate all the components against the same database table Since quick view, derived and computed columns can be used, this is not restrictive. The custom editor for triggers allows any previously defined triggers to be added as subtriggers to form part of a new compound trigger.

Trigger evaluation is optimized for performance. If a compound trigger is evaluated, the evaluation is suspended as soon as possible (if the subtriggers are combined by AND, evaluation stops as soon as one of them fails; if they are combined by OR, evaluation stops as soon as one passes).

2. Support for Creation and Implementation of Business Rules.

A business rule is a verification associated to a single database table. During processing, there are points at which rules for the table are invoked (on add, on change, on update, on delete, on promote). At that point, all rules for the table that are specified for that event are invoked.

Each rule is gated by a trigger that determines whether to process the rule when it is invoked. This trigger is unique to the rule, but it is created by adding subtriggers that were defined using the trigger creation techniques described above. A list of all valid triggers for the database table is presented for their inclusion as subtriggers.

The creation and definition of rules is done using an editor for a Java bean property. This editor allows selection of a set of triggers for the rule (like compound triggers, the rule and combine subtriggers use AND or OR). The editor also allows the error message and help for the rule to be specified. The events where the rule should be invoked are chosen from within this editor.

The rule may include the name of a class to invoke for further processing. These classes all inherit from a common class. If a Java class for the rule is implemented, its redefinition of the rule processing method is invoked if the rule is triggered during processing (this happens when the events that invoke the rule occur, and the rules trigger gates are passed). These classes are isolated from the rest of the application, which means that the rules can be modified without affecting the rest of the application. The rule processing method gets enough context information so that it can easily be modified to do any additional processing that may be required.

3. Support for Reliable and Consistent Invocation of the Business Rules.

The Enterprise Application development platform includes invocation of the business rules at the appropriate points in processing. EADP provides a uniform and consistent application architecture and runtime environment which assures that the rules are properly invoked.

4. Support for both Interactive and Server Side Processing.

For interactive processing, EADP provides extensive facilities to flag fields and rows in error, and to display the error message associated to the row. For server side processing, EADP provides a list of message nodes for the error messages, which can be processed to provide all error messages in a batch fashion. Each message node has key information that identifies the data row in error.

5. Isolation of Business Logic.

This invention totally isolates business logic from any other code in the application.

6. The Ability to Create Business Rules Without Writing Java Code.

Trigger and rule definition is done using custom editors. No knowledge of Java or any other programming language is required. It is important to note that this invention does not introduce a specialized scripting language for rule definition.

7. The Ability to Change Business Logic Without Recompiling and Reinstalling the Application.

The bean to define triggers and rules is implemented as a Dynamic Java Bean (see RSW8-2000-0008). This means that the triggers and rules can be modified in the runtime application, without any need to alter application code. The facility to do this is provided by a Java application that calls up the same special editors used to edit triggers and rules during buildtime customization.

The discussion below describes in greater detail several of the above-identified elements of the preferred embodiment of the invention.

1. Support for Definition and Evaluation of Triggers.

Triggers and rules are both customized using editors that are associated to the custom editor for EADPLogicController (this uses the facilities for dynamic Java beans described in RSW8-2000-0008). The encloser class is a child of EADPApplicationClass (the child class controls a particular database table, for example OrdersApplicationClass would control the Orders table). The bean that is customized is the currentDatamanager of type EADPAManager, and the value in the property sheet of the bean that is customized is the logicController, of type EADPLogicController. The custom editor for EADPLogicController (named EADPLogicControllerDisplay in conformance with the dynabean standard) has buttons to bring up the custom editors for triggers and rules. The encloser class (e.g. OrdersApplicationClass) is used to provide linkage with the underlying database table (e.g. Orders).

Triggers are defined visually using the EADPTriggerDisplay class. The database and table for the trigger are determined by its encloser class. This class presents a window that allows the designer to define the following:

a. Trigger name

A descriptive name b. Trigger symbol

A short name without blanks used as the key for the trigger.

c. Trigger description

A longer text to document the business purpose or meaning of the trigger.

d. Data for simple triggers i. Column

The column in the table that will be evaluated. This is selected from a dropdown list that includes computed or derived columns that have been defined for that table. For EADP Business Factor Tables, this is further refined to use column values in the BFT rather than the raw data value as the source for the comparison.

ii. Operator

A dropdown list of operators to select how the data value will be compared to the trigger value.

iii. Trigger Value

The fixed comparison value that will be used to determine if the trigger condition is met.

An example might be a trigger for order cost less than fifty dollars. In this case, the column would be derived (summed) field that gives the total cost of the order. The comparison operator would be "<" and the trigger value would be 50.

e. Data for Compound Triggers i. Subtriggers

A drop down list shows all available triggers (ones that have been added to the logic controller for the encloser class). These may be added to the subtrigger list.

ii. And/Or

This toggle button determines whether AND or OR will be used to evaluate the subtriggers.

iii. True/False

This toggle button is used with a selected subtrigger. It determines if that subtrigger should evaluate to true or false when calculating the combined result.

Existing triggers can also be retrieved and modified (or deleted) from this window.

When a trigger is added, a new instance of EADPTriggerNode is created using the information provided in the window. If the trigger is a compound trigger, the subtriggers are stored in a Vector within the node, are created for each subtrigger, and they are combined in an ordered collection that is stored as an attribute of the trigger. Each entry in the list is a text string that records whether that subtrigger is to be evaluated to true or false, and the symbol for the subtrigger.

The initialization string for the logicController value includes an initialization string that records the trigger definition. The EADPTriggerNode has methods (getString and getJavaString) to create an initialization string for that node. On the reverse side, the node has a setFromString method that takes an appropriate fragment of the initialization string and uses it to set up that node.

Trigger evaluation is provided by the EADPLogicController, which is the logicController property of the EADPDAManager (this is the property customized to set up the triggers). Each trigger node has the current instance of logic controller as an attribute. The logic controller in turn is assigned the current row (as an instance of EADPPeristentObject) when trigger evaluation is required. The trigger node, if it is a simple trigger, uses its column name to find the column value in the current row, and then compares that (using the proper comparison operator) against the trigger value that is part of the trigger node definition. As will be understood by those of ordinary skill in the art, preferably everything is cast into the proper class type for the comparison. If the trigger is a compound trigger, each of the subtriggers is evaluated as described above, and the collection of results is used to determine the result of the trigger. This is done so that the minimum number of subtriggers needs to be evaluated—if the combining condition is AND, evaluation of the subtriggers continues until one fails. If it is OR, evaluation continues until one succeeds.

2. Support for Creation and Implementation of Business Rules.

Like triggers, rules are defined visually by customizing the logicController property. The custom editor for the logicController has a button that brings up the EADPRulesDisplay panel. The database and table for the rules is determined by the encloser (a child of EADPApplicationClass). For example, to define rules for the Orders table, the logicController property of the data manager bean in OrdersApplicationClass would be customized. Since the rules require triggers to gate the rules, preferably the necessary triggers are defined first.

The EADPRulesDisplay panel presents a window that allows the designer to define the following:

a. Rule name

A descriptive name b. Rule symbol

A short name without blanks used as the name for the method that will be generated to implement the rule. The symbol is also used as the key for the rule in the Rule Dictionary.

c. Rule Description

A longer text to document the business purpose or meaning of the rule.

d. Message Text and Help

If the rule is not redefined, the default behavior is to issue the error message specified here.

e. Invoke When

This set of toggle buttons is used to determine at what points in processing the rule is to be invoked. The choices are:

On Add
On change
On Update
On Delete
On Promote
On Success

Any combination can be used.

f. Method Class

This is the class name of a class that can be optionally defined to do further processing of the rule. The class needs to inherit from com.ibm.eadp.rules.EADPRuleMethodClass, and redefine the processRule method.

g. Triggers

Each rule has its own trigger, which may be a compound trigger made up of subtriggers defined as described above (the trigger for the rule is stored with the rule and does not show up in the list of triggers defined for the database table).

The processing for defining a compound trigger for the rule is the same as for compound triggers described above.

Rules can also be modified and deleted from this window.

When a rule is saved, a new instance of EADPRuleNode is created in memory. As with the triggers, the rule nodes have methods to generate initialization strings for saving the bean property, and to recreate themselves from the initialization string. The initialization strings for the rule nodes and trigger nodes are combined into the initialization string for the logicController property to achieve its bean customization.

3. Support for Reliable and Consistent Invocation of the Business Rules.

Rule invocation is provided by the EADPDAManager (see RSW8-2000-0007) and its logicController property (of type EADPLogicController). The logic controller has a ruleController property (of type EADPRuleController). Its processRule method is responsible for doing the rule processing. This method is called by EADPDAManager when any activity (add, change, delete, promote, etc.) is processed against a row (an instance of EADPPersistentObject). The processRule method is passed the type of the update, and the row. It then checks for any rules defined to the logic controller (these are set up using the bean customizations described above). Each rule is checked to see if it is to be invoked for the passed activity type; if so, the passed row is used to evaluate the trigger conditions for the rule. An instance variable (the process result) is used to determine overall success or failure of the repeated calls to processRule during an application process that involves more than one row. If an error message is issued by rule, an instance of EADPMessageNode is created. The worst return code is tracked; if it is negative, processing stops after the verifications are invoked.

The invocation of rules as events occur ensures that business rules are uniformly enforced. For example, "add" verifications are also invoked on copy.

4. The Ability to Change Business Logic Without Recompiling and Reinstalling the Application.

The customer editor for the logicController has buttons to bring up the edit panels for rules and triggers. It also has the Register button which it inherits from EADPDynaBeanDisplay (see RSW8-2000-0008). This stores the initialization string for the logicController (which defines the triggers and rules) in a table (the EADPBEAN table) for the database for the encloser. This initialization string can then be updated on the database using EADP dynamic bean facilities.

The preferred embodiment of this invention, as described above, has a number of important advantages.

1. The Enterprise Application Development Platform is unique in that it recognizes a common layer of processing common to all (or at least most) business applications. This allows EADP solutions (including the business logic support presented here) to be applied to a wide variety of businesses.

2. The decomposition of business rules into triggers and rules presented here is an important advantage. This is particularly true for the way compound triggers are defined. This is a simple, efficient and easily maintained way to present complex logical decisions.

3. The ability to update the business logic at runtime using the dynabean facilities is very useful. This offers a comprehensive ability to change any business rule (except the ones implemented by Java methods) without recompiling or reinstalling the application.

4. EADP offers a very optimized application architecture, and the positioning of the business logic provides an excellent level of isolation and very reliable execution.

The present invention has been implemented in the Enterprise Application Development Platform (EADP). The user manual for this facility is included herein a Appendix A.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The Enterprise Application Development Platform for VisualAge® Java User Guide The Enterprise Application Development Platform for
VisualAge® Java
User Guide Persistence Builder Edition
Revised for VisualAge 3.02
James R. Wason Senior Technical Staff Member IBM Global Services Sterling Forest, New York wason@us.ibm.com May 31, 2000

Filename = EADPJA3.HTML (c) Copyright IBM Corporation 2000. All rights reserved.

Table of Contents

1.0 Welcome

- 1.1 What's new for VA 3.02?
    - 1.1.1 Enhanced quick view facilities
    - 1.1.2 String handling in computed fields
    - 1.1.3 Calculated keys

- 1.1.4 Security enhancements
- 1.1.5 Scrolling capability for large databases.
- 1.2 What you need to know about VisualAge®?
- 1.3 Why use EADP?
    - 1.3.1 EADP and Persistence Builder
    - 1.3.2 Build it fast, build it to last

2.0 What is EADP?

- 2.1 Complex Object Support
    - 2.1.1 Primary Complex Objects
    - 2.1.2 Cascaded Complex Object Actions
    - 2.1.3 Quick Views of Normalized Data
    - 2.1.4 Complex Object Support Terms and Concepts
        - 2.1.4.1 The ruler to subobject relationship
        - 2.1.4.2 A database example.
        - 2.1.4.3 Quick Views
        - 2.1.4.4 Complex Object Presentation and Focal Data
- 2.2 Version Control Support.
    - 2.2.1 Formal rules for version control manipulation.
    - 2.2.2 Enhanced Complex Object Support
    - 2.2.3 Isolation of the version control mechanism
    - 2.2.4 Support for relating version controlled objects.
    - 2.2.5 Support for CUA presentation
    - 2.2.6 Version approval and formalization
    - 2.2.7 Audit trails
    - 2.2.8 Version Selection Rules
- 2.3 Business Factor Tables
- 2.4 Derived Fields
    - 2.4.1 Computed fields within a row.
    - 2.4.2 Derived fields for subobjects.
- 2.5 Business Policy Support
    - 2.5.1 Business Rules
    - 2.5.2 Triggers
        - 2.5.2.1 Simple Triggers
        - 2.5.2.2 Compound Triggers
- 2.6 Report and batch interface support
    - 2.6.1 Templates
    - 2.6.2 Macros

3.0 Designing your application to use the EADP

4.0 Importing the EADP Applications.

App.-2

5.0 Setting up a sample complex object

- 5.1 What you will achieve
- 5.2 Setting up the Persistence Builder Model.
- 5.3 Setting up a test application.
- 5.4 Creating the data base parts
    - 5.4.1 Setting up the database definition class
    - 6.2.2 Customizing the complexObjectStructure property
        - 6.2.2.1 Connecting to the database.
    - 5.4.3 Creating the Customers part
    - 5.4.4 Creating the Item Catalog part
    - 5.4.5 Creating the Orders part
    - 5.4.6 Creating the Line Items part
    - 5.4.7 Finishing touches
        - 5.4.7.1 Column Names
        - 5.4.7.2 Object Names
        - 5.4.7.3 Derived fields
- 5.5 Setting up a default for the Line Item key.
    - 5.5.1 Setting up a new summary column.
    - 5.5.2 Setting up a default editor.
    - 5.5.3 Making the default a special editor for an attribute.
- 5.6 Creating the applet to enter application.
    - 5.6.1 Customizing the application applet.
    - 5.6.2 Allowing the connection to be changed.
    - 5.6.4 Testing the part.
    - 5.6.4 Testing the part.
- 5.7 Creating the list parts for the application.
    - 5.7.1 Creating the list part for Orders.
    - 5.7.2 Creating the list part for Line Items.
    - 5.7.3 Testing the Orders and Line Items list parts.
        - 5.7.3.1 Testing customizations.
    - 5.7.4 Entry Panels.
        - 5.7.4.1 Creating the default entry part for Orders.
        - 5.7.4.2 Creating a custom entry part for Orders.
        - 5.7.4.3 Creating the default entry part for Line Items.
        - 5.7.4.4 Test the entry panels.
    - 5.7.5 Complex Object Actions.
        - 5.7.5.1 Adding a Line Item for an Order.
        - 5.7.5.2 Copying Orders and Line Items.
        - 5.7.5.3 Deleting Orders and Line Items.

6.0 Setting up a version control sample

- 6.1 What you will achieve.

- 6.1.1 Setting up the complex object structure.
- 6.1.2 Setting up the Persistence Builder Definition.
- 6.2 Setting up a version control sample application.
    - 6.2.1 Setting up the database definition class
    - 6.2.2 Customizing the complexObjectStructure property
        - 6.2.2.1 Connecting to the database.
    - 6.2.3 Creating the Affected Item part.
    - 6.2.4 Creating the Item Header part.
    - 6.2.6 Adding Item data to the Affected Item Part.
    - 6.2.6 Adding Item data to the Affected Item Part.
- 6.3 Creating the visual parts.
- 6.4 Creating, Deleting and Undoing Versions
    - 6.4.1 Creating a New Version.
    - 6.4.2 Using the Undo Function.
        - 6.4.2.1 Undo of Modified Data.
        - 6.4.2.2 Undo of Inserted Data.
        - 6.4.2.3 Undo of Extracted Data.
    - 6.4.3 Deleting a Version.

7.0 Batch File Support

- 7.1 Creating Report Templates
    - 7.1.1 Opening the Template Editor for Reports
    - 7.1.2 The Structure of a Template
    - 7.1.3 Creating a Template to Start a Report
    - 7.1.4 Adding a Template for Order Data
    - 7.1.5 Adding a Template for Line Item Data
    - 7.1.6 Testing the Report

8.0 The EADP Help Facility

- 8.1 Enabling EADP help for panels.
- 8.2 Defining the help content.

9.0 Using EADP Interface Support.

- 9.1 Defining Interface Templates.
    - 9.1.1 Mapping templates to records.
    - 9.1.2 Setting up a template to parse a record.
    - 9.1.3 An interface example.
- 9.2 Running interfaces.

10.0 Using EADP Business Rules Support.

- 10.1 Using EADP Business Factor Tables.
- 10.2 Setting up a BFT.

App.-4

- 10.3 Making the BFT a special editor for an attribute.
- 10.4 Using DynaBean Customization for the BFT.
- 10.5 Setting Triggers
    - 10.5.1 Setting a Simple Trigger
    - 10.5.2 Setting a Simple BFT Trigger
    - 10.5.3 Setting a Simple Summary Trigger
    - 10.5.4 Setting a Compound Trigger
- 10.6 Adding Business Rules
    - 10.6.1 Adding Business Rule Example

11.0 Using more advanced features in EADP.

- 11.1 Restricting Quick View Selection
- 11.2 Specifying strong and weak quick views

12.0 Some more advanced programming techniques.

- 12.1 Extending EADP Classes.
    - 12.1.1 Extending EADPApplicationClass.
    - 12.1.2 Extending EADPDAManager
    - 12.1.3 Extending EADPPersistentObject
- 12.2 Accessing EADP Data.
    - 12.2.1 Accessing EADP Data Manager data.
    - 12.2.2 Accessing EADP Persistent Object data.
- 12.3 Reusing EADP Parts.
    - 12.3.1 Using the EADP Container Part.
    - 12.3.2 Using the EADP Slide Panel.

1.0 Welcome

Welcome to the Enterprise Application Development Platform (EADP). This guide will explain how EADP can help you develop VisualAge® applications more effectively. We will begin with a quick overview that describes some of the services that are available, and how you can use the EADP effectively to design and implement your application. Then we will give some detailed examples which should get you ready to build applications on your own using EADP.

1.1 What's new for VA 3.02?

Those of you who have downloaded previous versions of EADP may be interested in knowing what is different here. If you are new to EADP, skip this section because it won't make sense until you understand more of the terminology.

1.1.1 Enhanced quick view facilities

The 3.02 version introduces many enhancements to take advantage of Persistence Builder relationships; for the most part these are improvements to EADP quick view processing. Quick view relationships can now be navigated just like ruler to subobject relationships (they are presented as usages of the source of the relationship). The notion of "strong" quick view relationships (which are required for update of the target) and "weak" quick view relationships (which are transparent to the user) are introduced. There is also improved capability to describe how to link relationships to provide enhanced navigation -- for example, the "zoom" buttons that allow concatenation of quick view relationships to define quick view columns.

There is also the capability to restrict the selection for a quick view prompt when there is another path to the same target. The other relationship path can be used to restrict which rows are available for selection.

Summary fields can now be defined over a quick view relationship just as they are over a subobject relationship.

1.1.2 String handling in computed fields

Previously computed fields were restricted to numeric data. You can now define string handling computations, and these can be mixed with numeric computations.

1.1.3 Calculated keys

It is now possible to add a custom editor that will default the key value in a new row to the "next" key within a defined sequence. This works when the row is added within the constraints of a bound relationship (a subobject or string quick view relationship). An example would be the "next" line number for a line item in an order. Note that the key can be string or numeric.

1.1.4 Security enhancements

EADP internal processing now allows a "session id" to be passed through. This can be used to restrict which objects are presented to the user.

1.1.5 Scrolling capability for large databases.

EADP has always allowed the restriction of query results by means of selection criteria. What is new here is the capability to limit the results of unbounded queries. The maxrows feature in JDBC is used to limit the number of row returned; in addition, an order by clause is added to the selection to make sure results are returned in key order. A restart capability is also provided to select the "next" set of rows; this permits controlled scrolling through a large database.

App.-6

1.2 What you need to know about VisualAge®?

The version of EADP described here is an extension of the Persistence Builder features of VisualAge® for Java. It provides enhanced support to create sophisticated business applications using visual programming. EADP also adds some flexibility to Persistence Builder. It allows a selection string to be specified to limit database selection, and it allows the database connection to be specified at runtime. EADP protects against unbounded queries by limiting the number of rows processed by the query, and it provides restart logic to allow scrolling through a large database. In addition, EADP provides visual parts that allow tabular update.

Before reading about EADP or attempting the examples, you should be familiar with some of the examples in the Persistence Builder user guide. You will find that EADP makes the programming involved considerably simpler. However, you should understand how to create models and schema within Persistence Builder.

Sample databases are included in this package which allow you to use either DB/2 or an ODBC database as the sample database. If all else fails you should be able to use the dBase 5 driver included as a part of the ODBC package. Most features will work using the image persistence feature of Persistence Builder; however, if you do this you will not be able to use the prebuilt sample databases.

1.3 Why use EADP?

EADP is the next generation in visual programming. It lets you design complicated business applications using visual design techniques. Using EADP, you can do rapid prototyping and iterative development on applications that were too large for other tools to handle. This greatly increases the chances that your application development will succeed.

EADP is integrated with the database design environment provided by Persistence Builder, and adds additional models to control presentation and business logic. The combination provides a total development environment that allows the entire application to be model driven for both design and execution.

EADP adds some vital features to Persistence Builder to allow the proper handling of large databases. It provides convenient wrappers for Persistence Builder transaction management and relationship management so that you don't have to write your own code to take advantage of these features.

EADP is based on many years of experience in developing large scale data base applications. It pulls out function that has traditionally been considered application specific, and lets you add it to your new application using the same visual programming techniques as the rest of the VisualAge® product. Some examples are:
1. Centralization of design and implementation. EADP provides a consistent context for all the App.-7 features you need to produce a complete working application. In EADP, a design element is defined one time in one place, and is consistently applied throughout the application (examples of this are database verifications, external names, version control, and complex object rules). Each of these design elements is isolated and can be changed independently. The EADP toolset gives an organized presentation of these design elements so that you can quickly create them, and continue to control them once they have been created.

2. Linking together data in different tables. For example, if customer number is part of the purchase order table, providing customer name and address with the list of purchase orders.

3. Providing transitions from one table to another, for example from a list of purchase orders to the list of lines for a selected purchase order. Any navigable relationship defined in Persistence Builder can be used to define a data navigation in EADP. In addition, EADP provides some capability to join relationships to provide enhanced navigation.

4. Adding derived fields to a list. For example, if the purchase order line includes unit price and quantity, including the total price of the line item (unit cost times quantity) as a derived field. EADP can provide both numeric and text based computed fields, and it can mix and match numeric and text conversions within one computation.

5. Providing defaults for fields. The same mechanism used for computing derived fields can be used to provide default values that are based on related data. This can be particularly useful for providing the value of the "next" key based on the maximum of existing keys that are bound together by a relationship.

6. Adding derived fields based on calculations over a related table. For example, the total cost of a purchase order, which is calculated as the sum of the total price of the lines for that purchase order.

7. Adding business meanings for the data. EADP provides two support mechanisms, Business Factor Tables and triggers to do this. These allow you to define date states that are used to drive decisions within the application.

8. Organizing and isolating business policies and rules. Verifications can be isolated from the rest of the application. Many verifications can be defined completely using visual programming techniques.

9. Isolating informal data. EADP version control gives you the capability to define persistent App.-8 units of work, and to keep an audit trail of changes to your data over time.

10. Generating reports and batch interface files. EADP template processing allows you to quickly define report and batch file layouts.

11. External name support. EADP allows central definition of the external names of data elements. This includes usage in titles for list columns and entry fields, the names of your tables when displayed to the user, and the displayed value for data elements with discrete values.

12. Server support. Although EADP comes with a visual interface based on applets, it is fully configured for server side support. EADP provides well defined and tested interfaces for server side application development. One advantage of this is that the applet interface can be used during development to test the EADP based applications. EADP then provides adapters (not included in this package) to hook other interfaces into the server side code.

1.3.1 EADP and Persistence Builder

The Persistence Builder edition of EADP uses Persistence Builder facilities for database modeling. This includes defining the relationships that are important for EADP (these are the "quick view" and "ruler to subobject" relationships). For the most part, EADP function interacts with Persistence Builder at the model level, so that EADP doesn't care how that model is implemented. For example, you can use Persistence Builder image persistence instead of the the supplied sample databases to do the samples (of course, you will have to load in the data by hand). However, there are some advanced features, such as the use of the target field name for quick view relationships, which depend on the sql code generated by Persistence Builder. These have been tested for DB2, but may not necessarily work for other database systems.

The application layer of EADP includes logic to handle Persistence Builder transaction levels. The "quick view" facilities provide an easy way to implement normalized data using Persistence Builder associations. EADP complex object support works within the context of Persistence Builder one to many relationships. Finally, EADP version control provides a way of mapping "fuzzy" relationships within Persistence Builder, and it provides complete application support to make this easy to use within applications.

EADP visual support provides list parts that support tabular update (these are resizable and also support split panel capability). EADP also provides support for focal data, and both canned and very customizable entry panels.

1.3.2 Build it fast, build it to last

EADP lets you build a working prototype with complex panel transitions quickly and effectively.

App.- 9

More important, it gives you a framework to build an application that is easy to understand and maintain. It does this by allowing you to centralize and control data definitions, external names and the implementation of business policies. All of these are effectively isolated so that they can be changed without breaking the rest of the application. One final benefit is that EADP provides a well defined context in which to design your application, so the process of translating requirements into implementation becomes greatly simplified.

2.0 What is EADP?

EADP provides run-time services which your application can invoke instead of reinventing them. It also provides build time services to allow you to build your application visually using the Visual Composition Editor. These services work together in an integrated manner; however, for convenience, we have broken them out into several components.

2.1 Complex Object Support

Some very simple data base applications use only one type of data base table to store their data. Usually, however, several different types of tables are required. The application then needs to present the data from these multiple tables in a way that allows the user to navigate easily through the data.

2.1.1 Primary Complex Objects

The ORDERENT database that was shipped as a sample with VisualAge® Smalltalk Version 2 is a fairly typical example (this is included as one of the sample databases here). It has four tables: CUSTOMERS, ORDERS, LINE_ITEMS, and ITEM_CATALOG. The LINE_ITEMS table has line items for the purchase order (this is an example of a one-to-many type data relationship that forces use of a separate table). Although it is possible to present all the line items for all the orders in one big list, it makes more sense to select an order first (from a list of selected rows in the ORDERS table), and then use this to select a list of lines for that order. The purchase order, which is the collection of the data in ORDERS and LINE_ITEMS table (for a particular order number) is a small example of a "primary" complex object relationship.

2.1.2 Cascaded Complex Object Actions

Once you have set up a primary complex object, the delete and copy actions can cascade through the complex object structure. The same mechanisms that are used to select subobjects for presentation are used to select the subobjects to process for the cascaded actions.

2.1.3 Quick Views of Normalized Data

App.-10

More subtle relationships are to be found among the other tables. For example, the ORDERS table includes CUSTOMER number. However, a user view of the purchase order might want to show additional columns from the CUSTOMERS table, such as name and address information. The "quick view" facility of EADP allows you to include this normalized data using visual programming techniques.

2.1.4 Complex Object Support Terms and Concepts

Most applications need to deal with panel transitions and normalized data, but until now the logic to do it has been regarded as application specific. EADP abstracts several behaviors which are common to all complex objects. In order to talk about this, we need to introduce a few new terms and concepts:

2.1.4.1 The ruler to subobject relationship

A ruler to subobject relationship is a special kind of one to many relationship where the "one" object controls the "many" object (for example, a purchase order header controls the line items for the purchase order). This is the relationship that glues together complex objects. When an object processes, it does so in the context of its rulers. Within Persistence Builder, each type of class needs to have a primary key. For a ruler to subject relationship to be in place, the primary key of the ruler must form part of the primary key of the subobject. When this is modeled in Persistence Builder, the "ruler" relationship becomes one of components of the subobject key. In more complicated applications this can extend to an entire hierarchy (the same table may be both a ruler and a subobject).

2.1.4.2 A database example.

The ORDER_NUMBER column (in both ORDERS and LINE_ITEMS) is a good example of a key column. The value in the key column is used to glue together the complex object relationship between the two tables.

From a database perspective the logical key is a set of key columns which uniquely identifies a particular occurrence of an object. Within a "primary" complex object, the columns of a ruler provide a partial primary key of its associated subobject. For example, the physical key of the Purchase Order Header is ORDER_NUMBER, and the physical Key of the Purchase Order Line is ORDER_NUMBER/ORDER_LINE_NUMBER.

When this is modeled and mapped within Persistence Builder it may be a little less obvious. Suppose that onumb is mapped to the ORDER_NUMBER column of the ORDERS table. Originally onumb is mapped to ORDER_NUMBER and lnumb to ORDER_LINE_NUMBER in the LINE_ITEM table. However, when a ruler -> subobject association is set up, the "ruler" relationship in the Lines model takes the place of onumb. So the primary key is now ruler/lnumb (the example for the ORDERENT database will do this in detail).

App - 11

EADP function uses a naming convention to pick out which Persistence Builder relationships are ruler to subobject. The name of the "ruler" role should always be ruler. A subobject can only have one ruler, so this safe.(In addition, as noted above, ruler should form part of the primary key of the subobject). A ruler can have many subobjects; for each, the role name should begin with subobject. The standard names that you can use in the Java version are subobject1, subobject2, subobject3, etc.

2.1.4.3 Quick Views

A quick view is another type of one to many relationship that handles normalized data needed for lookup. For example, references to a customer object from within an orders object. The "one" side of the relationship (the customer) is not the ruler of the order. However, the data for the customer needs to be accessible from within the order.

Physically, quick views are implemented by mapping the relationship to the primary key column in the source table (the Customer), and to a foreign key (the quick view column) in the target table (the Order). This mapping is done within Persistence Builder. EADP then allows you to pull in data from the customer (such as name, street, etc.) and include it with the visual presentation and application logic of the Order. To distinguish quick view relationships, the source role should begin with qvsource (qvsource, qvsource1, etc.). The reverse role should begin with qvtarget, and use the same suffix as its associated source.

You can also use quick view relationships for data navigation, if you set up the relationship correctly in Persistence Builder. The default list panels provided with EADP include the ability to navigate through both directions of a quick view relationship. The "source" side of the relationship is viewed using the "quick open" facility. The "target" side is presented as a usage of the source.

*2.1.4.3.1 Strong and Weak Quick Views:* The 3.02 edition of EADP introduces the motion of "strong" and "weak" quick views. A "strong" quick view is almost like a ruler to subobject relationship. The difference is that for a ruler to subobject relationship the ruler relationship is part of the key for the subobject; this is not necessarily true for a "strong" quick view. If an object is the target for a strong quick view, it cannot be created except from a list of usages for the source relationship -- this is similar to the rule that a subobject must be created within the context of its ruler. This allows key values to be determined from the maximum of the keys within the context of the strong quick view relationship. An example would be to calculate the next order number for a particular customer based on the maximum of the order numbers so far for that customer.

Weak quick view are used to provide header records for summary calculations. Weak quick views can be made transparent within the application so that they do not impede user creation of data. The "source row" for the weak quick view is system created.

2.1.4.4 Complex Object Presentation and Focal Data

App.-12

You can visually create the subobject list panel. It is automatically connected to the list panel for its ruler. On the subobject panel you can visually add "focal data" (this is data about the ruler). This is automatically filled in from the selected row for the ruler as the subobject panel is opened. EADP provides a focal data form, and list and entry panels for subobjects that incorporate it.

2.2 Version Control Support.

Most applications need version control. Quite often the initial descriptions of an application may not specifically point this out. However, there are several common application requirements which can be satisfied within the context of the version control support provided here. These are:
1. The need to segregate work in progress from completed and approved data.

This requirement is often expressed as the need for a "private cache" for a particular user. The version control support provided by EADP can isolate informal versions (work in progress), from formalized versions.

2. The need to keep a historical record of data.

The version control support in EADP keeps back levels of data. It does so selectively (only the data that is actually modified is copied to retain the previous information).

If you already have specific requirements for version control, you should be able to fit them into the version control mechanisms that EADP provides. EADP version control support isolates properties common to any version control mechanism, and provides a convenient way to plug in the application specific logic. One advantage of this approach is that as your version control requirements evolve, it is likely that you can isolate the changes without affecting the rest of the application. If you originally developed your application without version control, you can add it in later with a minimal amount of effort (as long as the application was developed using EADP).

EADP provides a default version control mechanism which will be useful for many applications. Named versions are controlled by version selection objects (VSOs). Each version selection object contains the name of the version, and the logical key of data that is version controlled (typically the top level of a complex object). A named version acts as a persistent unit of work; formalizing it is like a unit of work commit. Up to the point of formalization, all the updates done by that version can be rolled back (using the undo function).

EADP Version Control Support consists of:

2.2.1 Formal rules for version control manipulation.

In order to provide generic support for version control, certain formal behaviors must be isolated App.- 13 and abstracted. These are the concepts of logical key (which identifies associated data "up to" version selection), and selection sequence number. The data base columns which are part of the logical key are identified as within Persistence Builder as a "root" class for table. The primary key for the table class adds sequence number control which allows for multiple versions. There are two sequence numbers include as attributes; an insert sequence number which is part of the primary key, and an extract sequence number which is used along with the insert sequence number to control version selection. A specialized relationship (root to version) is used within Persistence Builder to associate the root to its versions (when this is modeled, the primary key of the versioned table becomes the root relationship plus the insert sequence number). EADP functions uses Persistence Builder generated queries to find the root and all its versions, and then uses its own application function to select a version associated to that root class (EADP processes this entirely at the model level, so that version control can be implemented using Persistence Builder image persistence).

2.2.2 Enhanced Complex Object Support

EADP Version Control Support is compatible with Complex Object Support. The ruler -> subobject relationships are mapped root to root if the classes have a root -> version relationship. In addition, there are several new complex object actions (promote, promote verify, and undo), which are cascaded.

2.2.3 Isolation of the version control mechanism

The version controlled object understands versions only in terms of the insert and extract sequence. The interpretation of these must be application specific. However, EADP gives you a set of methods to get you started. It also provides support for a common type of version control mechanism (version selection objects) so that you can get this up and running just by setting up the data base tables and Persistence Builder model.

2.2.4 Support for relating version controlled objects.

One of the problems with version control is that relationships get "fuzzy". An initial entity model may show that "A" is related to "B". However, once we introduce version control, "A" may have versions, "B" may have versions, and the relationship itself (if there is intersection data) may have versions also. Now, which version of "A" is related to which version of "B", and with what intersection data? There are some standard rules for sorting this out, and they are provided as a part of EADP.

These rules are used for selecting objects for quick view and derived (subobject) fields, so that the version control mechanism is fully integrated with the extended features of complex object support.

2.2.5 Support for CUA presentation

App.-14

The CUA presentation of version controlled objects is an extension of the CUA support provided for complex objects. This provides support for updates of version controlled objects (to ensure that an appropriate version is available for update when a version controlled object is opened from an entry or list panel). Presenting the top layer of a version controlled application is particularly tricky, since you need to be able to show all the versions of the top level level objects in the complex object hierarchy. EADP provides mechanisms to provide transitions (using visual programming in the Composition Editor) from a top level list (all versions of several master objects) to a subobject list of data related to one master object at one version.

2.2.6 Version approval and formalization

A version of data can be informal (it can be updated but not trusted because it may change) or formal (it can be trusted because it has been approved, but it can no longer be updated). EADP Version Control Support provides mechanisms for segregating formal versions from informal versions, for blocking updates when the version has been formalized, and for progressing a version from informal to formal status, or removing an informal version if it is not approved.

2.2.7 Audit trails

Insert/extract control is used to handle multiple versions of data for a complex object. This allows the complex object to be presented or updated at the various versions, without requiring that all the data for the complex object be copied to each version. All the back version can be accessed to provide an audit trail of how the data change over time.

2.2.8 Version Selection Rules

EADP uses Persistence Builder function to find all versions related to a root, and then selects the proper version or versions based on the following rules (in most cases a selection sequence is passed).
1. Applicable This selects the version with insert sequence less than or equal to the selection sequence and extract greater.

2. Affected At

This is like the Applicable, but it also includes data that was extracted by the version.

3. All Versions

This finds all rows which match the logical key.

App.-15

4. VSO Selection

The version selection object is associated to the root of the top object by a "reverse" ruler -> subobject relationship (the VSO plays the role of ruler, but its primary key includes subobject as a component). In this one case, the ruler is on the "many" side of the one to many relationship.

2.3 Business Factor Tables

A business factor table is a mechanism to isolate application decisions from the specific values of data elements. The value of the data element is used as the key to a row of the table. Application decisions are based on values in the corresponding columns. Business factor table support is fully integrated with other EADP functions. A new data type (coded data element) has been introduced for data elements with discrete value. Customization of coded data elements allows you to attach them to business factor tables, and to edit the business factor tables to adjust the row and column values. The business meaning of the particular column (or column value) can be captured in a trigger (see 2.5.2. "Triggers"). BFT's provide enhanced external name support to display the value of the data element using an external (meaningful) name.

2.4 Derived Fields

Much of the information that is of interest in an application is not stored directly on the database; instead it has to be derived or computed from the raw data. Business factor tables give one example of how EADP allows you to interpret data into user terms, and to store the business meaning of that data. Derived field support gives you the additional ability to present and manipulate derived data as if it were stored with the rest of the row on the data base. These derived fields can then be used to drive application logic.

2.4.1 Computed fields within a row.

EADP allows you to specify formulas to compute fields from data within one row. The fields that can be used in the calculation include other computed fields. For example, the line item includes a column for unit price and a column for quantity. A computed field can be added to multiply these, giving the total cost of the line item.

With EADP for VA 3.02, the ability to mix and match text and numeric calculation for computed fields is added. This includes the ability to split text at a certain substring, convert the remainder to a number, do numeric calculations with it, and convert the results back to text.

2.4.2 Derived fields for subobjects.

EADP also allows derived fields to be calculated for all rows of a subobject for a particular row (for example, all line items for an order), or for all usages of a source column in a quick view App.-16 relationship). This can be used to give the total cost of the order as a computed field. The formulas that are supported are all, sum, first, last, average, minimum, maximum and count. Any of these can be restricted to rows matching selection criteria specified by a simulated sql statement. Since this is processed as an internal trigger, the columns used for selection do not have to be restricted to true database columns; they can include other derived columns as well.

2.5 Business Policy Support

Business policy support allows you to control the implementation of business rules within your application. It encourages the isolation of these rules from each other and from the rest of the application, and it provides an efficient and convenient mechanism to implement these rules.

2.5.1 Business Rules

A business rule is an executable part of the application. Each rule is defined by the following:
1. The Persistence Builder class (database table) it acts upon.

2. The VisualAge® class that implements the rule.

3. The event that causes the rule to be invoked. These are:

1. Data creation
    2.
    3. Data modification
    4.
    5. Any data update (create or modify)
    6.
    7. Data deletion
    8.
    9. Data formalization
4. The error message to be issued if the rule fails 5. Any triggers to be used to check if the rule should be invoked Rule definition allows an implementing method to be defined. This is optional. If the rule is completely defined by its message and triggers, you don't need to do anything else. However, if you need to do more you can create a method to add any extra logic that is needed to fully implement the rule. This approach encourages the isolation of the rules logic from the rest of your application, and in many cases it will allow you to implement rules entirely through visual App.-17 programming.

2.5.2 Triggers

A trigger is an evaluation of whether or not the application data meets a certain condition or set of conditions. EADP allows you to define and document triggers, and to use them to drive business logic. It also provides a caching mechanism to allow for the efficient processing of triggers during runtime.

2.5.2.1 Simple Triggers

A simple trigger checks the value of a single attribute in a single table Persistence Builder class (if the attribute is supported by a BFT, it will check the value of a BFT column for the row that matches the value in the database column). EADP provides an external interface to define simple triggers. This includes documentation of what the trigger means. Simple triggers can use quick views and derived fields to make decisions based on complex business information.

2.5.2.2 Compound Triggers

A compound trigger is made up of simple or compound triggers. As each trigger is added, it can be evaluated as either true or false to provide the compound result. The set of triggers is then evaluated using "and" (all satisfy the true/false condition for the individual trigger) or "or" (at least one of the triggers satisfies its condition). When a compound trigger is evaluated, the evaluation stops as soon as the compound result has been determined.

2.6 Report and batch interface support

EADP uses a system of macros and templates to generate reports and batch interface files. A special macro is provided which allows you to conveniently write reports that include an entire complex object structure.

This same facility can be used in reverse to parse incoming batch files and use them to update databases controlled by EADP applications. In this case the template is a mask that shows how to parse the incoming records and map the data to fields in internal classes defined to EADP.

2.6.1 Templates

A template is a fragment of text with substitutions. The substitution areas are delimited by dollar signs. For report generation, you can:
1. Put an attribute name as a substitution name. This will place the value of that attribute (for the current row) in the text at that point. The external value will be used. You can add formatting information such as alignment after the name of the attribute. The attribute can be an actual App.-18 data base column, a quick view column, or a derived or computed field.

2. Indicate that you want to include data for a subobject at this point in the report. The substitution includes the name of the macro to process the subobject (which usually is the standard one provided by EADP), the name of the subobject's internal class, and the name of the template to be used to process the subobject.

For incoming batch processing, the macro name is the name of a macro that derives data from the input record and maps it to a particular field controlled by an EADP internal class (see 9.0, "Using EADP Interface Support.").

2.6.2 Macros

Macros are special VisualAge® classes which are used within template processing to gather data or to decide what to do next. A standard report macro is provided that finds all the subobjects (for the passed subobject type) that match the key of the current row. It then processes the passed template against the subobject row. This macro can be successively invoked by a series of templates to report an entire complex object structure.

3.0 Designing your application to use the EADP

The function provided in the EADP is an extension of the data base support provided by VisualAge® Persistence Builder. One important aspect of this is where "persistent" data is defined. Persistence Builder provides code generation facilities to create the model and service class needed for persistence support. EADP takes full advantage of this. The implication is that you should set up your Persistence Builder model and generate out the persistent services first. The model definitions for complex object support and version control need to be defined with Persistence Builder (using the correct naming conventions).

EADP also influences the way you set up your data base design. It is important to work out the transitions from table to table (this is what turns into the definition of the complex object structures). Once you have established this, make sure that the "key" columns are consistent where ruler -> subobject and root -> version relationships need to be mapped.

Once you have done this, you should be able to rapidly put up a shell of your application (using visual programming support provided by EADP) that will allow you to select and update the various tables in your application, and navigate through that data.

EADP also provides a well defined mechanism for implementing business rules. To take full advantage of this, you should be able to relate data conditions to business decisions. This will allow you to set up the necessary business factor tables and triggers. The triggers should become a vocabulary to describe your application in business terms. As you build rules, you should reuse the same vocabulary as much as possible.

EADP encourages you to make each business rule small and isolated. If you are using a top down approach, you can define the policies first, then the rules. However, it is probably better to define the triggers "bottom up" because typically the same trigger will be used in many different rules. If you don't understand the application well enough to do this in the beginning, keep in mind as you implement new rules that you should try to use existing triggers.

4.0 Importing the EADP Applications.

The file that is provided in the installation package is a self extracting zip file eadpjava.exe which includes the interchange files eadpjava.dat. This includes three projects that you need to import into your IDL (EADP Access Classes, EADP Views, and EADPSamplesProject). You need to load these into the Workspace. Make sure that you have loaded the IBM Persistence Builder EJB Library, the Visual Persistence and the VisualAge Persistence Common Runtime projects before attempting to load the EADP projects.

If you are operating at VAP levels other than 3.02, you will see that there are some errors in EADPDataStore (the signature of some of the abstract methods has changed from release to release of VAP). The corrections you need to make should be self evident; none of these methods are used by EADP, so they just need to be defined properly for your particular version of VAP.

The EADP projects are structured so that EADP Access Classes has no references to AWT classes and can be used for server side code. (Unfortunately, the VAP classes have a Swing dependency so they cannot be isolated quite so cleanly; however the use of these classes with server side EADP will not start an AWT thread on the server).

5.0 Setting up a sample complex object

The first example uses the sample data base ORDERENT which was shipped with the VisualAge® Smalltalk product in Version 2. You can install either the DB2 or dBase 5 (ODBC) version of this database.

The installation program assumes that you have already created the database.
1. To create the ODBC version of this database:

1. You should have the dBase 5 ODBC driver available as a part of the VisualAge® package. (Note that this was not shipped in recent versions of VisualAge).

App.-20

2.
3. Create a new directory x:\orderent (where x is the drive of your choice).
4.
5. In the ODBC administrator, configure ORDERENT as a dBase 5 data source with the orderent directory as the data source.
2. To create the database in DB2, issue the following line from a a DB2 command prompt (if you are not using UDB)

```
create database ORDERENT
```

If you are using UDB, you must create the database using the the Control Center.

Before you try to load the sample data, make sure that you have followed the instructions in the VA user manual to enable the database driver you will be using (the jdbcodbc driver or the db2 app driver).

Now run com.ibm.eadp.samples.EADPSampleDisplay. Choose the type of database you are loading, and press the Create button.

Make sure you have this data base installed, and that you have the data base manager opened before you try the examples.

5.1 What you will achieve

When you have completed this exercise, you will have a complete application allowing you to navigate through the ORDERENT tables. The transitions that you will be able to do are:
1. From a list of all orders to an entry panel for a particular order. The order list will include quick view data for the customer (name and address information).

2. From the list or entry panel for an order, to the entry panel for the customer using quick view.

3. From the list or entry panel for an order, to the list panel for all customers using prompt.

4. From a list of all orders to a list of line items a particular order. The focal data will be for that particular order, and will include the quick view data for the customer.

5. From a line item, to the entry panel for the item catalog for the item.

6. From a line item, to a list of all the entries in the item catalog, using prompt.

7. From the list panel of customers, to all the orders for a particular customer.

5.2 Setting up the Persistence Builder Model.

You can begin the Persistence Builder model by importing the schema from the database (orderent) and then generating a model from the schema (use Orderent for the schema and model name). Before generating the model make sure you remove any underscores from the table names and attribute names in the schema. Once you have done this, the following model relationships need to be set up:
1. A ruler to subobject relationship from Orders to Lines. The role of Orders should be ruler, and the role of Lines is subobject. Note that the "ruler" association replaces the order number attribute in Lines.

2. A quick view relationship from Customers to Orders. The role of Customer should be qvsource, and the role of Orders is qvtarget. Note that the "qvsource" association replaces the customer number attribute in Orders.

3. A quick view relationship from Lines to Catalog. The role of Catalog should be qvsource, and the role of Lines is qvtarget. Note that the "qvsource" association replaces the item number attribute in Lines.

Make sure that primary keys are set up as follows:
1. Orders order number

2. Lines.

ruler, line number

3. Customer customer number

4. Item Catalog 5. item number

You must now update the schema and map to reflect these changes. In the schema you must add foreign key relationships for the associations. You need a foreign key relationship from customers to orders (linked by customer number), one from orders to lines (linked by order number) and one from item catalog to line items (linked by item number). The next step is to go the the map (this was generated along with the model from the schema) to reflect the changes you made in the model. You will see that the removed attributes show up as broken. You need to delete them. You will need to map the associations to the appropriate foreign key relationships. You can then generate the Persistence Builder model and service e classes. When you generate the model, make sure you use EADPEntityBeanImpl as the base class. This is the link between EADP and the classes generated by Persistence Builder.

A note for more experienced Persistence Builder users -- if you are familiar with Persistence Builder will you find it more natural to set up the foreign key relationships in the schema before generating the model. The advantage of this is that it avoids creating attribute names in the model which later need to be deleted. If you set up the foreign key relationships in the schema correctly, the model will be generated with all the ruler to subobject and quick view relationships. Of course, you will have to rename them as specified above, so that EADP can recognize them. This approach will also minimize the amount of rework you need to do to the map.

5.3 Setting up a test application.
1. In the VisualAge® Workbench, create a new project (call it OrderEntryProject), and a new package for the project (OrderEntryPackage).

5.4 Creating the data base parts

The next step is to create the data base parts to manage the tables and transitions. We'll start with a very small complex object structure; from a list of orders to a list of line items for that order. However, we will also add quick views to the customer and the item catalog.

The Java version of EADP is not quite as seamless as the Smalltalk version because it relies strictly on Java bean customization techniques (and cannot automatically create new classes). There are also differences in the way classes know about other classes in the system that must be allowed for. To compensate for this, the definition of the database classes is a two step process. The first step is to define the class names and how they participate in the complex object structure (what table the class maps to, and what its ruler is). The next step is to create the class and do any additional customizations to provide quick views and derived fields.

5.4.1 Setting up the database definition class

App.-23

The overall complex definition for the application is defined by customizing a child of EADPDatabaseDefinition.
1. In the OrderEntryPackage, create a new class OrderentDefinitionClass with EADPDatabaseDefinition as its parent.

2. Open the Visual Composition for OrderentDefinitionClass and add two beans

1. A bean called directory of type EADPDirectoryClass. Connect its "this" property to the currentDirectory property of the definition class.
   2.
   3. A bean called connection of type EADPVapConnection. Connect its "this" property to the vapConnection property of the definition class.

The overall application definition is now achieved by customizing the properties in these two beans.
3. The connection bean is customized with connection information. Customize the datastore property to point to the singleton for the datastore class generated out by Persistence Builder. For example, if you keep the default database name of Orderent, and use all defaults, you would enter
OrderentModelPackage.Services.OrderentOrderentDataStore.singleton()

This step is the link that binds the EADP classes to the Persistence Builder classes. The Persistence Builder datastore class has information that lets it access all the other classes generated by Persistence Builder. EADP will use this in the next step to generate initialization strings that EADP uses in its operations.

4. Save the customizations (generate runtime code) before the next step. This is so that the custom editor for the definition bean can connect to the Persistence Builder classes.

5. The complex object definition is set up by customizing the complexObjectStructure property of the directory bean.

5.4.2 Customizing the complexObjectStructure property

When this part is customized, a custom edit panel appears that will define to EADP the overall complex object structure for the application. The function of this panel is to map application classes (children of EADPApplicationClass) to nodes in the complex object structure (each node has an associated table, and possibly a ruler table as well). Each node has information that EADP App.-24 needs at run time (and in some cases build time) to process the Persistence Builder relationships.

There is very little for you to do to accomplish this step; however, it triggers a great deal of system activity. What is happening is that the code generated by Persistence Builder is being analyzed to determine the relationships of interest to EADP. These are then bound into initialization strings for the complex object structure, so that the process does not have to be repeated at runtime. Note that if you go back into Persistence Builder to change your data model (which is likely to happen many times during the course of development) you have to repeat this step to make sure that EADP understands the Persistence Builder code.

5.4.2.1 Connecting to the database.

The first step is to use the Connect button. This will connect to the database, and initialize the other fields. Make sure that the Datastore that appears at the top left of the panel is correct. This step uses the datastore information you set up when the connection bean was customized, so make sure you did this and saved the customizations.

Once the connect button has processed, you will see a list of table names in the table list. Selecting a table will display the corresponding application class name EADP will use for that table. You have to create the classes with this name. You can come back here for reference if you forget the correct name (you may find it easier to browse the generated initialization strings, which will contain the class names as the first entry. These can be copied and pasted into the class name needed to define the application class when it is created within VisualAge).

At this point all customizations are complete. Press the OK button and save and close the definition class. Make sure you do this step; it is required to properly generate the initialization strings that bind the EADP and VAP classes.

5.4.3 Creating the Customers part

1. In the Workbench, define a new class CustomersApplicationClass as a child of EADPApplicationClass. Note that the name should match what was specified when you set up the complex object structure.

2. In the visual editor, add a bean called definition of type OrderentDefinitionClass.

3. Connect the "this" property of the definition bean to the databaseDefintion property of the application class.

4. In the visual editor, add a bean called manager of type EADPDAManager.

5. Connect the "this" property of the manager bean to the currentDatamanager property of the application class.

5.4.4 Creating the Item Catalog part
1. In the Workbench, define a new class ItemcatalogApplicationClass as a child of EADPApplicationClass. Note that the name should match what was specified when you set up the complex object structure.

2. In the visual editor, add a bean called definition of type OrderentDefinitionClass.

3. Connect the "this" property of the definition bean to the databaseDefintion property of the application class.

4. In the visual editor, add a bean called manager of type EADPDAManager.

5. Connect the "this" property of the manager bean to the currentDatamanager property of the application class.

Note -- if you are lazy you can copy the CustomersApplicationClass instead!

5.4.5 Creating the Orders part
1. In the Workbench, define a new class OrdersApplicationClass as a child of EADPApplicationClass. Note that the name should match what was specified when you set up the complex object structure.

2. In the visual editor, add a bean called definition of type OrderentDefinitionClass.

3. Connect the "this" property of the definition bean to the databaseDefintion property of the application class.

4. In the visual editor, add a bean called manager of type EADPDAManager.

5. Connect the "this" property of the manager bean to the currentDatamanager property of the application class.

Note -- if you are lazy you can copy the CustomersApplicationClass instead!

Save this much of the customization before the next step, so that the quick views editor can connect to the database.

We have enough information set up at this point to make the quick view links to the Customer table. Quick views are now defined by customizing the quickViews property in the manager bean.
1. Customizing this property will place you in the quick views custom editor.

2. From the drop-down for Source Columns select qvsource.

3. You should see the columns for the customer table appear in the "QV Table Columns" list.

4. Select NAME from the "Table Columns" list. Press the "Add QV Column" button, and NAME will be added to the "Quick View Columns" list.

5. Repeat this for any other columns you want to pull into the quick view. In particular, you will want to add c_numb.

6. Press the Update button to save your selections and exit the "Create Quick View" panel by pressing the OK button.

When you return to the Visual Editor, save the part and exit.

You are probably wondering what the Zoom buttons do. The sample application is too simple to demonstrate them completely -- if Customers had quick view relationships itself, the "Zoom In" button would let you select one of those relationships, and then add its fields as quick views. "Zoom Out" lets you move back down. You can only update when you have Zoomed out to the original level.

5.4.6 Creating the Line Items part
1. In the Workbench, define a new class LinesFromOrdersApplicationClass as a child of EADPApplicationClass. Note that the name should match what was specified when you set up the complex object structure.

2. In the visual editor, add a bean called definition of type OrderentDefinitionClass.

3. Connect the "this" property of the definition bean to the databaseDefintion property of the application class.

App.-27

4. In the visual editor, add a bean called manager of type EADPDAManager.

5. Connect the "this" property of the manager bean to the currentDatamanager property of the application class.

We have enough information set up at this point to make the quick view links to the Catalog table. Quick views are now defined by customizing the quickViews property in the manager bean.
1. Customizing this property will place you in the quick views custom editor.

2. From the drop-down for Source Columns select qvsource.

3. You should see the columns for the catalog table appear in the "QV Table Columns" list.

4. Select DESCRIPTION from the "Table Columns" list. Press the "Add QV Column" button, and DESCRIPTION will be added to the "Quick View Columns" list.

5. Repeat this for any other columns you want to pull into the quick view.

6. Press the Update button to save your selections and exit the "Create Quick View" panel by pressing the OK button.

5.4.7 Finishing touches

5.4.7.1 Column Names

The default for the names of columns (as they appear in the table parts created by doing a quick form), is the data base name for the columns, separated into words and placed in mixed case (this is what VisualAge® uses also). However, EADP allows you to set up the column names globally. This is done by customizing the externalNames property for the directory bean in the definition class (for our example, OrderentDefinitionClass).

To define external names for the internal class and columns, customize this property. This will bring up the custom edit panel for external names.
1. A list of the internal classes you have defined so far will appear. OrdersApplicationClass, A list of the columns you have defined (including the quick view and subobject columns) will App. - 28 appear.

2. Type in an external name for the class (e.g "Orders") and press the "Set Application" button.

3. Type in an external names for the some of the columns and press the "Set Column" button after each one.

1. C_NUMB "Customer Id"
   2.
   3. C_NUMB:NAME "Customer Name"

5.4.7.2 Object Names

There are times that EADP needs to display the name of an internal class (for error messages, and also to show which subobjects can be selected for a particular ruler object). The default is to use the internal class name (e.g. OrdersApplication). As explained above, you can set the external name for the object using the facilities of the external names custom editor. For example, you can specify "Line Items" as the external name for LinesFromOrdersApplicationClass.

5.4.7.3 Derived fields

Derived fields allow you to display information that is contained in a combination of columns, or spread over several tables. This data can later be used to drive business logic, just as if it existed directly on the database. We will add two cost fields; one to show the cost of each line item, and a second to show the total cost of an order.

To add the cost of a line:
1. Open LinesFromOrdersApplicationClass.

2. Open the properties sheet for the manager bean.

3. Select the computedColumns property to customize. This will bring up the computed columns custom editor.

4. There will be no entries in the Computed Columns list since you have not defined any computed fields yet.

5. From the Source Columns list select QUANTITY. Press the Set button next to "a Column".

App.-29

You will see it appear in the "a Column" position.

6. From the Source Columns list select PRICE Press the Set button next to "b Column". You will see it appear in the "b Column" position.

7. You are now ready to write the formula to calculate the derived field. The rules for writing a formula are as follows:

1. The source values are a, b, c, or d. You indicate which columns provide source values by adding them to the SOURCE COLUMNS list.
    2.
    3. Any valid Java expression involving +,-,/ and * can be used within the formula. You can use parentheses and literal numeric expressions (e.g. 12*(a+B) ).
8. In our case, the derived field is just the product of the two source fields, so the formula is:
    a*b 9. Enter the name linecost in the Computed Column Name text area.

10. Press the Update button.

11. Use the OK button to close the custom editor. Save and close the part.

You can also use string expressions in computations. String expressions are distinguished by the fact that they are enclosed in square brackets. Within string expressions, literals can be specified by enclosing them the "pointy brackets " (< and >). You need do do this if you are using a reserved symbol (a, b c, d, +, -, /, *, or a bracket) as a literal. The same operators (+, -, / and *) are used for string operations, but they have different meanings. A + is used to concatenate two strings. The other operators are used for substring operations. a-b means remove the string b from a. a*b is the string a up to the first occurrence of the substring b. a/b is the part of string a beyond the first occurrence of b. a%b is the part of a beyond the last occurrence of b.

The use of curly brackets around an expression forces its results to be evaluated as numeric. Here is an example -- suppose Campaigns are numbered CP-1, CP-2 etc. Tactics within a campaign are numbered T-1-1, T-1-2 etc. so for example the tactics for CP-35 are T-35-1 and T-35-2. We want to calculate the next tactic number. The first step is to add a quick view for campaign number to get the "a" column (which will have the value CP-35). The next step is to set up a summary column for the maximum existing tactic number (the "b" column, which will have the value (T-35-2). The formula for the next id number is now:

App.-30

[T+[a/<->]+[<->+{[b%<->]+1}]}

Now we can add a summary field ordercost to orders.
1. Open OrdersApplicationClass.

2. Open the properties sheet for the manager bean.

3. Select the summaryColumns property to customize. This will bring up the summary columns custom editor.

4. Select LinesFromOrdersApplicationClass from the Subobject list (if you customized this to have an external name, the external name (e.g Line Items) will show up here). You should see the columns for the line item table appear in the "Source Columns" list.

5. Select linecost from the "Source Columns" list.

6. Select "Sum" from Summary Function List.

7. Specify the name for the summary column (ordercost) in the summary column name field.

8. Press the Update button. be added to the "Quick View Columns" list.

9. Press the Update button.

10. Use the OK button to close the custom editor. Save and close the part.

5.5 Setting up a default for the Line Item key.

EADP provides a mechanism to provide default values over "bound" relationships (such as a ruler or a "strong" quick view. Note that since the default is applied as a new object is created the relationship must already be in place before then. This is true if the new object is created within a subobject list (the ruler will already be established) or from a list of usages for the strong quick App.-31 view.

In this case we will default a new line number for an order by taking the maximum of the existing line numbers and adding one. This is a relatively simple calculation because only numbers are involved. However, as the discussion of computed values indicated, you can mix string and numeric values for a calculation of this type.

A default editor is defined by creating a child of EADPBusinessEditor. This class implements java.beans.PropertyEditor, so it allows you to use the BFT as a special editor. It is customized using a custom editor for the value manager (see the example below). Once you have set up the default editor, you link to a field by defining it as the special editor for that field.

5.5.1 Setting up a new summary column.

The default editor will use a new summary column called linemax, which is set up as above, but using the Maximum function to get the maximum line number.

5.5.2 Setting up a default editor.

1. In OrderentPackage, create a new class called LineNumberEditor that inherits from EADPBusinessEditor.

2. In the Visual Composition editor, add a bean of type OrderentDefintionClass (call it dataDef) and connect its "this" attribute to the dynaBeanDataDefinition attribute of the part.

3. Save the part, close and reopen it.

4. In the Visual Composition editor, add a bean of type EADPBusinessValueManager (call it manager) and connect its "this" attribute to the manager attribute of the part.

5. Save and close the part, then reopen it.

6. Open the properties sheet for the manager bean, select the businessValue property property, and double click to open the custom editor.

Enter the following formula:
&ruler;:summary:linemax&+1

App.-32

The expression after the & sign will be translated to be the "a" column for the formula.

5.5.3 Making the default a special editor for an attribute.
1. In the Visual Composition editor for LinesFromOrdersApplicationClass open the properties sheet for the manager bean.

2. Open the custom editor for the specialConverters bean.

3. From the Table Columns list select lineordernumber.

4. In the Special Converter field type
OrderentPackage.LineNumberEditor

5. Press the Set button.

6. Close the special editor and the properties sheet and save the class.

5.6 Creating the applet to enter application.

EADP provides default parts to view the application. All you need to do to get started to set up an "application entry" applet. After that, you can customize individual panels as you desire. Most of the testing of the application logic can be done using just the application entry applet and the default panels.

5.6.1 Customizing the application applet.
1. In the Workbench, select the OrderEntryPackage, and create a new class OrdersEntryApplet as a child of EADPApplicationEntryApplet. The parent class will show up as a visual bean in the Visual Editor. The new class is defined by customizing properties of the parent bean.

2. Customize the databaseDefinition property to
new OrderentDefinitionClass()

This is the one visual customization that MUST be done to tie the visual parts to the underlying App.-33 application classes (everything else can be allowed to default).

5.6.2 Allowing the connection to be changed.

You specified a connection (probably the DB2 application driver and the local URL) when you set up the classes for the application within Persistence Builder. However, as you deploy the application you may want to change the driver, the URL, or the name of the database. The applet allows the URL and connection to be specified as parameters, and the userid and password can be entered on the applet screen.

However, in order to get this new connection information to be recognized, you need to make the Persistence Builder datastore adjustable. This requires a little more coding than most steps in EADP.
1. In the Workspace, select the services package that was generated. If you took all defaults it will be called OrderentOrderentPacakage.Services.

2. Select the data store class (it should be called OrderentOrderentDataStore), and open it.

3. Go to the BeanInfo tab and add a new property called connectionSpec of type DatabaseConnectionSpec. Note that this step will replace the connection information generated by VAP. If you want to retain the old information as a default, before you create the new property, copy the exsiting getConnectionSpec method to a new method called getBaseConnectionSpec. Then, after the new getConnectionSpec method is generated for the property, modify it to call getBaseConnectionSpec as the default initialization. Note that if you regenerate the VAP code, you will lose the getConnectionSpec method. You can replace it easily from the repository.

4. Now go to the Hierarchy tab and open the class definition. Add the following at the end of the first line
```
implements com.ibm.eadp.vap.EADPAdjustableDatastore
```

5.6.3 Setting the class path.

Before you can test the part, you must set up the class path. Select the Run option in the Workspace, then Check Class Path. You need EADPAccessClasses and VisualAge Persistence as well as whatever project you set up for the DB2 classes. If you placed the Persistence Builder classes generated for the application in a different project, make sure that is included as well.

App.-34

5.6.4 Testing the part.

To test it, select the Run option and select Run as Applet or Run Main. Press the Connect Button. Once you are connected, you will see a list of the top objects. You can select one, and press the Open button. Testing of the various list and entry panels is described below; however, you can use the default panels if you want to.

5.7 Creating the list parts for the application.

Now that you have defined the data base parts, you can use visual programming techniques to create the user interfaces. EADP provides true container parts with tabular update capability for visual presentation of the lists.

You can skip this step if you want to, since EADP provides default parts which will give an immediate presentation of the application. However, for a real application you would probably want to do some customization.

We will begin by creating the visual part just for the ORDERS table, and then add the transition to the list of Line Items.

5.7.1 Creating the list part for Orders.

Orders is a top object. When a its list panel is invoked, the manager class and the connection are already set up. The only customization that needs to be done is to select which columns to display, and also which fields to show in the focal data.

The top object lists are brought up as new frames. To accomplish this, a visual bean EADPTopobjectForm (which inherits from panel) is provided. Each new top object list inherits from Frame, adds a bean of type EADPTopobjectForm, and implements the EADPListPanel interface.
1. In the Orderent package, create a new class OrdersListPanel as a child of Frame, implementing EADPListPanel.

2. In the Visual Editor, add a bean called TopobjectForm of type EADPTopobjectForm.

3. Implement the showListPanel method as follows:
```
getTopobjectForm().setDataManager(aManager);
```
```
this.show();
```

App.-35

4. Now customize the listPanelClassName property of the manager bean in
   OrdersApplicationClass to
   `OrdersListPanel`

This is how the data manager knows a special subobject list panel has been set up.

5. You can specify which columns you want to see on the list and the column lengths (in pixels) by customizing the Display Columns and Display Column Widths properties. For example, you can customize Display Columns as follows: (for ODBC)

```
onumb qvsource:cnumb status qvsource:name summary:ordercost (for db2)
ordernumber qvsource:customernumber status qvsource:name summary:ordercost
```

Note that the summary column has a prefix, and that the quick view columns are prefixed by the name of the column they are linked to.

You should specify a length for every column you define in Display Columns by adding a corresponding entry to Display Column Widths.

6. Save the part. To test it, select the application entry applet (OderentEntryApplet) in the Workspace, and select the run option. Make sure that you have the class path set up properly App.-36

(you need EADPAccessClasses and VisualAge Persistence as well as whatever project you set up for the DB2 classes).

When the window comes up, press the Connect button, then the Open button with the Orders table selected. This will bring up the list panel for orders.

7. Now press the List Actions button, and select the Open option. You should see a list of all ORDERS.

You can use the selection text area to limit selection of the orders (this adds SQL selection criteria, so you should use real column names for real columns (e.g. order_number, customer_number, and status). This is function that EADP adds on top of Persistence Builder to allow limiting of the selection of top objects.

You can test the Open Row and Drill Down actions now to see what the default panels look like. In the next step we will set up a customized list panel for line items.

5.7.2 Creating the list part for Line Items.

Line Items is a subobject. When a subobject list panel is invoked, the manager class and the connection are already set up. The only customization that needs to be done is to select which columns to display, and also which fields to show in the focal data.

The subobject lists are brought up as new frames. To accomplish this, a visual bean that inherits from panel EADPSubobjectForm, is provided. Each new subobject list inherits from Frame, adds a bean of type EADPSubobjectForm, and implements the EADPListPanel interface.

1. In the Orderent package, create a new class LinesFromOrdersListPanel as a child of Frame, implementing EADPListPanel.

2. In the Visual Editor, add a bean called SubobjectForm of type EADPSubobjectForm.

3. Implement the showListPanel method as follows:
```
getSubobjectForm().setDataManager(aManager);

this.show();
```

4. You can customize the columns that are shown on the list by customizing Display Columns and Display Column Widths as for the orders list panel. One thing to watch out for is that the computed column (linecost) is known internally as computed:linecost.

App.-37

5. There is also a section above the list that shows focal data. By default, all fields from the ruler (or rulers) are shown here. You can limit this by customizing the Display Fields property.

6. Save the part. You will have to wait until the next step to test it.

7. Now customize the listPanelClassName property of the manager bean in LinesFromOrdersApplicationClass to
`LinesFromOrdersListPanel`

This is how the data manager knows a special subobject list panel has been set up.

5.7.3 Testing the Orders and Line Items list parts.

Now we test the connection between the ORDERS and LINE_ITEMS tables. This will allow you to select one row from the ORDERS table, and open a list of Line Items for that order.
1. Go back the TestOrdersExternal and run the part.

2. Select one of the orders. The row will turn a different color (the row selection color) and the column a different color still (the cell selection color). These are customizable properties of the EADPTopObjectDisplay bean.

3. The dropdown list of subobjects should show "Line Items" (or LinesFromOrdersApplicationClass if you didn't set the external name) as the selected subobject.

4. Press the "Drill Down" button.

5. You should see a list of Line Items for that customer, and the order information in the focal data. You can select another order and open its Line Items also; another window will appear. Note that VisualAge® seems to like to put all the new windows at the same spot on the display, so you may have to move them off one by one to see the next one that comes up.

5.7.3.1 Testing customizations.

You can now test any customizations you have made (see 5.4.5, "Creating the Orders part"). Any changes you made to the column names for display should show up as the titles for the column App.-38 headings.
1. Open a list of Orders.

2. Tab to a cell under the C_NUMB column. It should turn a different color to show that is has been selected.

3. Move the mouse into the list table and press the right button. You will see a popup menu.

4. Click on the "Prompt" button.

5. You will see a list of customers (the list is not filled in yet). Enter a selection text (e.g NAME LIKE Joe%) and press the Open button. Now choose the row, and press the Select button. The corresponding row in the orders table will be updated with the selected customer.

5.7.4 Entry Panels.

All updates can be made using the list panels described above. However, for larger rows, entry panels may be required as well. EADP provides a convenient mechanism for setting up the entry panels and linking them to the list panels. We will demonstrate this by setting up entry panels for Orders and Line Items.

There are two types of entry panels that can be created. The first (a "default" entry panel) allows you to select which database columns (or added derived columns) you want to display as in the list panels, but it does not allow much flexibility on arranging the fields. The second technique lets you add and arrange label and text fields using the Visual Composition editor -- this allows you to make the panel look exactly the way you want it.

The technique for creating default entry panels is very similar to that for subobject panels

5.7.4.1 Creating the default entry part for Orders.
1. In the Orderent package, create a new class OrdersEntryPanel as a child of Frame, implementing EADPDisplayPanel.

2. In the Visual Editor, add a bean called EntryForm of type EADPEntryRow.

3. Implement the showDisplayForm method as follows:
```
getEntryForm().setTargetRow(eadpObject);

this.show();
```

4. You can customize the columns that are shown on the panel by customizing Column Names and Column Lengths as for the orders list panel.

5. Save the part. You will have to wait until the next step to test it.

6. Now customize the entryPanelClassName property of the manager bean in OrdersApplicationClass to
OrdersEntryPanel This is how the data manager knows a special subobject entry panel has been set up.

5.7.4.2 Creating a custom entry part for Orders.

You may want to arrange fields more densely that the default entry panels allows (or you may want to have labels above instead beside the entry fields). A custom entry panel allows you more flexibility, while still retaining most of the benefits of using EADP. The custom panel, like the default panel, expects to be passed a target row. It uses three types of parts to handle data from the target row (a helper part, a specialized label part, and a specialized text field).

1. In the Orderent package, create a new class OrdersEntryPanelCustom as a child of Frame, implementing EADPEntryPanel.

2. In the Visual Editor, add a panel bean inside the frame.

3. In the Visual Editor, add a bean called DisplayHelper of type EADPDisplayHelper (note that you add this outside the frame part).

4. Connect the "this" attribute of the panel part to the "sourcePart" attribute of the DisplayHelper.

5. Open the property sheet for the DisplayHelper and set application name to the full name (including the package name) of the application class for Orders (i.e. Orderent.OrdersApplicationClass).

6. Save the part (this is so that the next customizations will pick up a list of column names from the Orders class).

7. Now you can add and arrange label and text fields (all of these should be added to the panel part).

1. Add a bean of type EADPLabel. Set the name to OrderLabel. Open the property sheet for the label field and open the custom editor for the columnName propery. Select ordernumber from the drop down list and press Select, then Okay.
   2. The reason you are doing this this way is so that the label will show the common external name that you specify for order number. If you wanted to use a different name, you would just use an ordinary label field.
   3.
   4. Add a bean of type EADPEntryTextField. Set the name to OrderText. Open the property sheet for the text field and open the custom editor for the columnName propery. Select ordernumber from the drop down list and press Select, then Okay.
   5.
   6. Repeat the same process for any other fields you want to add. Note that you can rearrange the labels and fields any way you want to.

8. Implement the showDisplayForm method as follows:
```
getDisplayHelper().setTargetRow(eadpObject);

this.show();
```

9. Save the part. You will have to wait until the next step to test it.

10. Now customize the entryPanelClassName property of the manager bean in OrdersApplicationClass to
`OrdersEntryPanelCustom`

This is how the data manager knows a special subobject entry panel has been set up.

5.7.4.3 Creating the default entry part for Line Items.
1. In the Orderent package, create a new class LinesFromOrdersEntryPanel as a child of Frame, implementing EADPEntryPanel.

2. In the Visual Editor, add a bean called EntryForm of type EADPEntryRow.

App.-41

3. You can customize the columns that are shown on the panel by customizing Column Names and Column Lengths as for the orders list panel. One thing to watch out for is that the computed column (linecost) is known internally as computed:linecost.

4. You can also add focal data to the panel by adding a focal data bean. Add a bean call FocalData of type EADPFocalDataForm. You can customize which fields to show as in the line items list panel.

5. Implement the showDisplayForm method as follows:
```
getEntryForm().setTargetRow(eadpObject);

getFocalData().setTargetRow(
eadpObject.getCurrentDatamanager().getFocalDataRow());

this.show();
```

6. Save the part. You will have to wait until the next step to test it.

7. Now customize the entryPanelClassName property of the manager bean in
   LinesFromOrdersApplicationClass to
   `LinesFromOrdersEntryPanel`

This is how the data manager knows a special subobject entry panel has been set up.

5.7.4.4 Test the entry panels.
1. From the list panel, select a row and press the Open Row button.

2. Updates are flagged as focus is lost in a cell or data entry field. As you update a field in the entry panel, you should see the same field updated in the list panel and vice versa.

5.7.5 Complex Object Actions.

You can now exercise the complex object support for copy and delete.

App.-42

5.7.5.1 Adding a Line Item for an Order.

This will show how a line item is set up using the correct order number when is it added to subobject list.
1. Open the list panel for orders, and open the list of orders.

2. Select an order, and select the then select Line Items and press the Drill Down button.

3. On the list of Line Items window, click the New Row choice in the File menu.

You will see a new row added to the list. Note that the order number is set to match the order you selected to find the list of Line Items. Fill in the rest of the data and press the Apply button.

5.7.5.2 Copying Orders and Line Items.

This will show how all the Line Items for one order are copied to another order.
1. Open the list panel for orders, and open the list of orders.

2. Select an order (one which has line items), and press the Copy Row option from the List Actions button.

3. Set an order number for the new order, and then click Apply.

4. Now open the list of Line Items for the new order. They will be identical to the list of Line Items for the old order.

5.7.5.3 Deleting Orders and Line Items.

This will show how all the line items for an order are deleted when that order is deleted.
1. Open the list panel for orders, and open the list of orders.

2. Select an order (one which has Line Items).

3. For the selected order, click the Delete Row option on the File Menu, then click Apply.

4. You can set up a standard list of line items using the data access builder to verify that the line items are really gone.

App.-43

6.0 Setting up a version control sample

The next example uses the sample data base EADPSAMP which is shipped with the EADP product. Make sure you have this data base installed, and that you have the data base manager opened before you try the examples.

The samples can be loaded using either DB2 (UDB) or dBase V.
1. If you are using DB2 you must create the database definition in DB2. connection for the database.

2. If you are using ODBC, make sure that EADPSAMP is defined as a data source for dBase V.

3. If you are using ODBC, make sure that you set the shortVersions property in the datastore bean of the database definition class to True.

To install the samples, run the applet com.ibm.eadp.samples.EADPVersionSampleDisplay. Select the type of database manager you are using (DB2 or dBase 5) and then press the Create button.

6.1 What you will achieve.

This example will introduce some of the basic concepts of version control, and will demonstrate how EADP manages versions of data. It will familiarize you with the use of version selection objects, and how EADP chooses data at various versions.

The sample database for version control represents a small engineering records application that allows version controlled changes to part (item) and bill of material data. It has three tables:
1. AFFECTED_ITEM (VERSION for ODBC users)

This is the table for the version selection object. It is keyed by EC_NUMBER (EC_NUMB) and ITEM_NUMBER (I_NUMB). EC stands for "Engineering Change". In an engineering records application, an Engineering Change is used to bundle together a group of related changes to different pieces of data. It is an example of a persistent unit of work. The table includes a column VSO_SEQUENCE (VSOSEQ) which is used to select versions of item data.

2. ITEM_HEADER (ITEMHDR for ODBC)

This table contains basic information about the item. It is keyed by ITEM_NUMBER. The table includes two columns to enable version control, INSERTSEQ and EXTRACTSEQ (these are App.-44 called INSERT and EXTRACT for ODBC).

3. COMPONENT (COMPNNT for ODBC)

This table sets up the item to item relationship to establish a bill of material (the component items are parts of the assembly). The assembly item is the ITEM_NUMBER column, and the component number is the COMPONENT column (these are both key columns). The table includes two columns to enable version control, INSERTSEQ and EXTRACTSEQ.

6.1.1 Setting up the complex object structure.
1. ITEM_HEADER to COMPONENT

There is a simple complex object relationship from ITEM_HEADER to COMPONENT. The two tables are linked by ITEM_NUMBER, and COMPONENT_NUMBER is the additional key in the COMPONENT table.

2. COMPONENT to ITEM_HEADER.

A more subtle relationship is from COMPONENT_NUMBER back to the ITEM_HEADER data for the component item. We will implement this using quick views. One example will be a quick view to show the name of the component item along with the rest of the component data. As we will see, if the name changes from version to version, we will select the appropriate version of that data to display with the component. Later, we will use the quick view capability to add triggers for verifications of the component item's data when the component is processed.

3. AFFECTED_ITEM to ITEM_HEADER.

At first glance, it looks as if ITEM_HEADER should be the ruler of AFFECTED_ITEM, since the AFFECTED_ITEM table adds an additional key (EC_NUMBER). However, a more typical processing path is to first select a version of the item data (represented by the affected item), and then process the item data at that version. EADP allows you to do this by establishing the AFFECTED_ITEM table as a "VSO ruler" of the ITEM_HEADER table.

6.1.2 Setting up the Persistence Builder Definition.

Begin by importing the schema from the database (call it EADPSAMP) and generating the model from the schema. Note that the model includes root tables and version tables for both Item and Component.

There are three types of relationships that must be captured. The item is a ruler of the components. However, both the item and component have versions. In order to make the ruler -> subobject relationship a true foreign key relationship, item root and component root tables are introduced. These have the keys of the tables "up to version" as their primary keys. The item root table has item number as its primary key, and the component table has bom number and component number as its primary key. The ruler -> subobject association is a foreign key relationship between the item number and the bom number. Next, there are version control related relationships. The item header has a version relationship with its root. The item header has the same keys as the root, plus the insert sequence number. The same sort of relationship is true for the component and its root. These are expressed as vaproot -> version relationships.

The affected item object acts as a version selection object for the items. It has two fields in its primary key: the item number, and an ec number (ec stands for engineering change, which is the way items are versioned in the real world). From a complex object perspective, the flow of control is from affected item to item header, so the affected item is defined in a ruler -> subobject relationship as the ruler of the item root. However, this is reversed from most ruler -> subobject relationships because the item key (the item number) forms part of the key of the affected item. Because the "single link" and "many link" classes have different Java types, this reversed relationship has a slightly different name for the roles (vsoruler and vsosubobject). This is so the generated code can be recognized properly by the EADP classes. Finally, there is a quick view relationship from the component number in the component back to the item root.

The net effect of all these relationships is that almost every attribute in the "data" objects gets replaced with an association. This is because the database is set up with very few data fields; in practice there would probably be twenty others that would be unaffected by all the model activity.

The following associations must be created:
1. A ruler to subobject relationship from the item root to the component root (the item root has the role of ruler and the component root has the role of subobject). This replaces the item number attribute in the component root (and forms part of the primary key).

2. A quick view relationship from the component root back to the item number (make sure the foreign key relationship maps to the component number in the component root). The item root has the role of qvsource, and the component is qvtarget. This replaces the component number in the component root and is the second part of the primary key.

3. A vsoruler to vsosubobject relationship from the affected item to the item root. The affected item has the role of vsoruler, and the item root is vsosubobject. The vsosubobject association replaces item number in the affected item and forms part of the primary key.

4. A version relationship from the item root to the item header. The item root has the role of vaproot and the item header has the role of version. The root association replaces item number in the item header.

App.-46

5. A version relationship from the component root to the component. The component root has the role of vaproot and the component has the role of version. The vaproot association replaces item number and component number in the component.

Once you have these set up the classes should have the following primary keys:
1. Affected item.

vsosubobject, ec number.

2. Item root item number

3. Item header vaproot, insert sequence.

4. Component root ruler, qvsource

5. Component vaproot, insert sequence

Note that the combination root -> subobject -> version from item header to component is a fuzzy (many to many) relationship. You do not have to do anything more to establish this within Persistence Builder. EADP provides all the function necessary to cut through the versions.

You must now update the schema and map to reflect these changes. In the schema you must add foreign key relationships for the associations. You need a foreign key relationship from item root to items (linked by item number), one from item root to component root (linked by item number), one from item root to affected item (linked by item number), one from item root to component (linking item number in the item root to the component number in the component) and one from component root to component (linking the item number and component number). lines (linked by order number). The next step is to go the the map (this was generated along with the model from the schema) to reflect the changes you made in the model. You will see that the removed attributes show up as broken. You need to delete them. You will need to map the associations to the appropriate foreign key relationships. You can then generate the Persistence Builder model and service e classes. When you generate the model, make sure you use EADPEntityBeanImpl as App.-47 the base class. This is the link between EADP and the classes generated by Persistence Builder.

6.2 Setting up a version control sample application.
1. In the VisualAge® Workbench, create a new package (call it EADPSampPackage)

6.2.1 Setting up the database definition class

The overall complex definition for the application is defined by customizing a child of EADPDatabaseDefinition.
1. In the EADPSampPackage, create a new class EADPSampDefinitionClass with EADPDatabaseDefinition as its parent.

1. A bean called directory of type EADPDirectoryClass. Connect its "this" property to the currentDirectory property of the definition class.
   2.
   3. A bean called connection of type EADPVapConnection. Connect its "this" property to the vapConnection property of the definition class.

The overall application definition is now achieved by customizing the properties in these two beans.
2. The connection bean is customized with connection information. Customize the datastore property to point to the singleton for the datastore class generated out by Persistence Builder. For example, if you keep the default database name of Orderent, and use all defaults, you would enter
`EadpsampModelPackage.Services.EadpsampEadpsampDataStore.singleton()`

This binds the EADP classes to the Persistence Builder classes.

3. Save the customizations (generate runtime code) before the next step.

4. The complex object definition is set up by customizing the complexObjectStructure property of the directory bean.

6.2.2 Customizing the complexObjectStructure property

When this part is customized, a custom edit panel appears that will define to EADP the overall complex object structure for the application. The function of this panel is to map application classes (children of EADPApplicationClass) to nodes in the complex object structure (each node has an associated table, and possibly a ruler table as well). At each node, the key columns are defined. The good news is that you don't need to supply any additional information here.

6.2.2.1 Connecting to the database.

The first step is to use the Connect button. This will connect to the database, and initialize the other fields. Make sure that the Datastore that appears at the top left of the panel is correct. This step uses the datastore information you set up when the connection bean was customized, so make sure you did this and saved the customizations.

Once the connect button has processed, you will see a list of table names in the table list. Selecting a table will display the corresponding application class name EADP will use for that table. You have to create the classes with this name. You can come back here for reference if you forget the correct name.

At this point all customizations are complete. Press the OK button and save and close the definition class. Make sure you do this step; it is required to properly generate the initialization strings that bind the EADP and VAP classes.

6.2.3 Creating the Affected Item part.

1. In the Workbench, define a new class AffectedItemApplicationClass as a child of EADPApplicationClass. Note that the name should match what was specified when you set up the complex object structure.

2. In the visual editor, add a bean called definition of type EadpsampDefinitionClass.

3. Connect the "this" property of the definition bean to the databaseDefintion property of the application class.

4. In the visual editor, add a bean called manager of type EADPVsoManager (note that you are using EADPVsoManager instead of EADPDAMAnager here. EADPVsoManager is a child of EADPDAManager).

5. Connect the "this" property of the manager bean to the currentDatamanager property of the application class.

6. Set the vsoSequenceColumn property to vso_sequence if you are using DB2, and to vsoseq for dBase V.

6.2.4 Creating the Item Header part.
1. In the Workbench, define a new class ItemHeaderFromAffectedItemApplicationClass as a child of EADPApplicationClass. Note that the name should match what was specified when you set up the complex object structure.

2. In the visual editor, add a bean called definition of type EadpsampDefinitionClass.

3. Connect the "this" property of the definition bean to the databaseDefinition property of the application class.

4. In the visual editor, add a bean called manager of type EADPDAManager.

5. Connect the "this" property of the manager bean to the currentDatamanager property of the application class.

6. Set the rulerIsVso property to True.

7. Set the versionControlled property to True.

6.2.5 Creating the Component part.
1. In the Workbench, define a new class ComponentFromItemHeaderFromAffectedItemApplicationClass as a child of EADPApplicationClass. Note that the name should match what was specified when you set up the complex object structure.

2. In the visual editor, add a bean called definition of type EadpsampDefinitionClass.

3. Connect the "this" property of the definition bean to the databaseDefinition property of the application class.

4. In the visual editor, add a bean called manager of type EADPDAManager.

5. Connect the "this" property of the manager bean to the currentDatamanager property of the application class.

App.-50

6. Set the versionControlled property of the manager bean to True.

7. Save the part (you need to do this before the next step so that the part is linked properly with its definition class.

8. Now open the custom editor for quickView property:

1. Select component_number as the source column.
    2.
    3. Select item_header as the quick view table.
    4.
    5. Select item_name as the quick table column.
    6.
    7. Press the Add Qv Column button.
    8.
    9. Press the Update Button.
    10.
    11. Press the OKAY Button.

9. Save the part again.

6.2.6 Adding Item data to the Affected Item Part.

The item number in the affected item was replaced by the vsoruler relationship. In order to see the item data, this has to be accessed through the vsoruler -> vsosubobject relationship. This can be done easily in EADP by defining the item data you wsnt to see as summary data using the summary function of FIRST.

1. In the Workbench, open the visual editor for the AffecteditemApplicationClass and open the property sheet for manager bean.

2. Open the custome editor for summaryColumns.

3. Select ITEMHEADERFROMAFFECTEDITEMAPPLICATIONCLASS from the list of subobjects.

4. Select vroot?itemnumber as the source column, and FIRST as the summary function.

App.-51

5. Specify a name for the summary column (e.g. item#).

6. Press the Update button.

7. Repeat this to add the item name as a summary column.

8. Now press the OK button.

9. Save the AffecteditemApplicationClass bean.

6.3 Creating the visual parts.

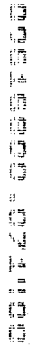

The only visual part you need to create for the rest of the demonstration is an application entry applet. To do this, create a part called EADPSampEntryApplet that inherits from EADPAplicationEntryApplet. Customize it as follows:
1. Customize the databaseDefinition property to
```
new EADPSampDefinitionClass()
```

2. Save the bean.

3. Now update the class path to include the generated VAP classes, EADPAccessClasses and VisualAge Persistence as well as whatever project you set up for the DB2 classes.

6.4 Creating, Deleting and Undoing Versions

This section introduces some of the more advanced features of version control. Each new version allows you to isolate changes and protect the data you have entered at other versions. As long as the version is in informal status, you can back out the work you have done at that version by deleting the version or by using the undo function to reverse the changes to a particular object. These examples do not require you to build any new panels. Instead, they will guide you through functions that you would perform as a user of the application that you have already built.

If you want to restore the database, you can do this easily by reinstalling it.

6.4.1 Creating a New Version.

App.-52

1. Run the ItemHeaderTopDisplay panel, connect, and open the list of affected items.

2. Select the row for Item P00001 at EC V00001.

3. Press "New Version" on the popup menu for the table part.

4. A new row will appear with all fields filled in except the EC number. Enter V00003 in this field (be sure to move the cursor off the field so the update is recorded).

5. Select "Apply" from the popup list menu.

You can now use the new version to modify header data, or to add, change or modify component data. There are some specific updates will we make in the next sections to demonstrate the undo and delete functions.

6.4.2 Using the Undo Function.

The undo function is used to back out the changes made by a particular version. It is invoked automatically when the version is deleted, but you can also use it on selected rows to restore the data for just that row.

6.4.2.1 Undo of Modified Data.

The simplest undo is of data that was modified at the version.
1. On the ItemHeaderTopDisplay panel change the Name of Item P00001 at V00003 to Item One C. Be sure to move the cursor off of the updated cell before you apply the change.

2. Now open the list of components for P00001 at V00003 and make the following updates:

1. Delete the component with component number P00003.
    2.
    3. Change the quantity of the component with component number P00004 to 3.
    4.
    5. Add a component with component number P00005.
3. Now undo the changes to the item header:

1. Select the row for Item P00001 at V00003.
    2.

3. On the popup menu for the table part, click "Undo Row".
4.
5. On the popup menu for the table part, click "Refresh". You will see that the name has been restored to its original value, and that the insert and extract sequence numbers show that the data is no longer affected by V00003.
6.
7. Refresh the component list panel. Notice that it is unchanged. Undo does not cascade if modified data is removed.

4. Now undo the added component:

1. On the component list panel, select the component with component number P00004.
   2.
   3. Select "Undo Row" from the popup menu.
   4.
   5. Refresh the panel. Notice that the row is missing. Since the version added the row, undoing it removes the row completely.

5. Now undo the deleted component. To do this, we have to be able to see it again.

1. From the popup menu, select "Open for Undo". Notice that the deleted component appears. This is because it was extracted (not physically deleted). If the component had been inserted by V00003 and then deleted, undo would not be able to restore it.
   2.
   3. Select the deleted component, and press "Undo Row" on the popup menu.
   4.
   5. Refresh the list. The deleted row has been restored.

6.4.2.2 Undo of Inserted Data.

When undo is applied to data that was created by the version, that data is physically deleted. The processing is the same as if the row was deleted (using Delete Row). This will cascade the delete to any subobjects.

We do not have data set up to completely demonstrate how this works (it is likely that your application may never be complicated enough to fully exploit this feature). However, we can demonstrate delete cascade by deleting the second version of an item header. Before starting this exercise, be sure you have restored the data to its original state.

1. Run the ItemHeaderTopDisplay panel, connect, and open the list of affected items.

2. Select the row for Item P00001 at EC V00002.

3. Open the item header.

4. Open the subobject list for components at EC V00002. Do this before deleting the header data so that you can see how the subobjects are affected.

5. Select Delete Row from the list popup menu on the header list panel, then select apply.

6. Refresh both the header list panel and the component list panel

7. Note that component list panel is now empty.

8. Now select "Refresh for Undo" on the on the popup menu for the table part.

9. The components will all appear again. However, they cannot be restored here, because there is no version of header data at V00002.

6.4.2.3 Undo of Extracted Data.

This continues the previous example. When the undo action is executed for extracted data, the action cascades to restore any subobjects that were also extracted.
1. On the item header list panel, select "Refresh for Undo" from the popup menu.

2. The deleted row (item P00001 at EC V00002) should reappear.

3. Select the row, and "Undo Row".

4. Now refresh both the item and component list panels. Notice that the deleted data has been restored on both panels.

6.4.3 Deleting a Version.

Deleting a version removes all the affects of that version, and also deletes the version selection object for that version.
1. Add a new version V00003 to item P00001 (see 6.4.1, "Creating a New Version."). Use the new version to modify data for both the header and components.

2. Open the component list panel at version V0002. Notice that the components that you modified at V0003 reflect this with their extract sequence numbers.

3. Now select item P00001 at V00003 on the header list panel, and select "Delete Version" from the popup menu.

4. Select Apply.

5. Refresh the component list panel at V00002. The components that were extracted by V00003 are now unextracted.

6. Refresh the item header list panel. The version V00003 is gone.

The version is completely removed. Refresh for undo will not restore it on the list panels.

7.0 Batch File Support

Templates can be used to set up batch interface files or reports. The example shown here will create a small report.

7.1 Creating Report Templates

The example given here is a very simple one. In a real situation, you might begin with an example of your output as a model for the template file. You can use the file options in the Template Editor to bring in a file to get started (or you can file out and file in the templates if you want to use a more powerful editor during the template creation).

Here are some basic steps to prepare a set of templates for a report:

7.1.1 Opening the Template Editor for Reports

Templates for an application are set up using the EADPTemplateDefinition bean. The first step is the add a bean of this type in the Visual Composition editor for OrderentDefinitionClass (call the bean part templateDef). Connect this "this" attribute of the templateDef bean to the templateDefinition attribute of OrderentDefinitionClass.
1. In the properties sheet for the TemplateDefinition bean, select templateDictionary, and double click to open the custom editor.

This will open the Template Editor. All templates are stored as entries in Java dictionaries. The Template Editor allows you to edit these dictionary entries as if they were ordinary text files, and to file them in and out of sequential files.

2. You are now ready to create the templates needed for the report.

7.1.2 The Structure of a Template

A template is a piece of text with imbedded keywords. The keywords are delimited by dollar signs. For example:

text1.. $keyword1$ text2.... $keyword2$... etc.

A template can span multiple lines of text. However, a special keyword $+$ at the end of a line indicates that a new line character should not be added when the template is processed.

When a template is processed, the text outside the keyword is passed along as in into the output stream. The text inside a keyword is evaluated according to the following rules:
1. The text up to the first comma is checked to see if it matches the name of a VisualAge® class. If it does, the "macro" class method of that class is invoked. One of the passed parameters is the rest of the text for the keyword (this is parsed by each macro).

The macro we will be using for reports is EADPReportMacro. Its macro method expects the rest of the keyword string to be in the format "(template name),(internal class name)".

1. The template name must be provided. It indicates which template will be used to process the next stage of the report.
2. 
3. The EADPReportMacro expects the "current row" to be passed as a parameter. If the internal class name is not included, it will process everything in the template based on the current row. If the internal class name is included, the class should be a subobject for the table for the current row. The current row is used to select rows of the subobjects, and then each of these is used to process the template. We will use this technique to start with a row from the customer table, and use it to select all orders for the customer. Then each row from the orders table will be used to select line items for that order.
2. If the first part of the text is not that name of a class, it should match the name of a variable is the substitution list. For reports, this means that it should match an attribute name for the current row being reported (these are the data base column names and any additional columns added through the Quick View functions). A quick way of finding out which names to use is to open the Visual Composition Editor for the class, open the properties sheet for the manager bean you added previously, and open the custom editor for computed columns. The source columns there gives a list of the column names you can use.

Any text after the comma is assumed to be formatting information:

1. The first piece is the name of the class which will do the formatting (for example PadRightFormat). If this is omitted, no special formatting is done. The data appears just as it would on the list or entry panels.
2.
3. If there is more data (delimited by a second comma) this is passed to the formatting class. For example, the length of the field is passed to PadRightFormat.

7.1.3 Creating a Template to Start a Report

The report will be initiated from the list of orders. You will test the report from the Scrapbook. The first step is to write a template to start processing.
1. In the Template Editor, enter the following in the Template Name box:

StartOrdersReport

2. In the Template Editor, enter the following in the Text Area box:
Title: Orders Report $EADPReportMacro,OrdersLine,OrdersApplicationClass$ This template will put out the line "Title: Orders Report" at the head of the report. The keyword then invokes EADPReportMacro, passing the current row, and telling it to use the OrdersLine template. The macro method of the EADPReportMacro class will prepare a variable list based on the column data in the current row before processing the template.

3. Click the Update button. You should see StartOrdersReport added to the list of templates.

7.1.4 Adding a Template for Order Data

The next step is to add a template to process the order data. This will have substitution keywords for the order columns we want on the report, and a macro keyword to bring in all the line items the order.
1. In the Template Editor, enter the following in the Template Name box:

OrdersLine

2. In the Template Editor, enter the following in the Text Area box:

```
Order #: $ordernumber$   Status: $status$

Line Items for Order $EADPReportMacro,LinesLine,LineitemsFromOrdersApplicationClass$
```

(if you are using dBase V)
```
Order #: $onumb$   Status: $status$

Line Items for Order $EADPReportMacro,LinesLine,LinesFromOrdersApplicationClass$
```

This template will put out the information for the indicated fields, using the values in the current row. A keyword then invokes EADPReportMacro, passing the current row, and telling it to use the LinesLine template. Since LinesFromOrdersApplicationClass is included, the current row will be used to select line items matching the order. The macro method of the EADPReportMacro class will loop through the list of rows prepare a variable list based on the column data on each row before processing the template.

3. Click the Update button. You should see OrdersLine added to the list of templates.

7.1.5 Adding a Template for Line Item Data

The final step is to add a template to process the line items. This will have substitution keywords for the line item columns we want on the report.
1. In the Template Editor, enter the following in the Template Name box:

LinesLine

2. In the Template Editor, enter the following in the Text Area box:
```
Line #: $orderlinenumber$ Item: $itemnumber$ $+$ Qty: $quantity$   Price: $price$
```

(if you are using dBase V)
```
Line #: $lnumb$ Item: $inumb$ $+$

Qty: $quantity$   Price: $price$
```

What is claimed is:

1. A method for applying business rules to data used in a computer application, comprising the steps:
   defining a set of business rules, each of the rules determining the validity of data used in an associated, defined computer application;
   storing the rules on a table external of the computer application;
   for each rule,
   invoking the rule at the occurrence of each of a defined set of operations on the data and while the rule is stored in said external table,
   identifying a predetermined trigger condition for the rule, and
   processing the rule if the predetermined trigger condition is satisfied to determine if data used in the computer application are valid.

2. A method according to claim 1, wherein the identifying step includes the steps of:
   identifying at least one data value;
   identifying a trigger value; and
   identifying an operator indicating how the data value will be compared to the trigger value.

3. A method of applying business rules to data used in a computer application, comprising the steps:
   defining a set of business rules, each of the rules determining the validity of data in an associated, defined computer application;
   storing the rules on a table external of the computer application;
   for each rule,
   invoking the rule at the occurrence of each of a defined set of operations on the data and while the rule is stored in said external table,
   identifying a predetermined trigger condition for the rule,
   invoking a predefined method if the trigger condition is partially satisfied, and
   using the method to apply the rule to determine if data used in the computer application are valid.

4. A method for managing business rules for data used in a computer application, comprising the steps:
   establishing a set of business rules, each of the rules including a trigger condition and a process, and each of the rules determining the validity of data in an associated, defined computer application;
   storing the rules in a table external of the computer application;
   performing a predefined operation on the data;
   checking all the rules in the table to determine if any are invoked by the predefined operation;
   for each rule that is invoked, determining whether the trigger condition of the rule is satisfied; and
   for each rule the trigger condition of which is satisfied, implementing the process of the rule and while the rule is stored in said external table to determine if data in the computer application are valid.

5. A method according to claim 4, further comprising the steps of:
   running an application using the data; and
   changing any of the business rules without recompiling or reinstalling the application.

6. A method according to claim 4, further comprising the step, upon rule failure, defining a message and help for each rule using visual programming techniques.

7. A method according to claim 6, further comprising the step, upon rule execution, adding the help and message to an error message list.

8. A system for managing business rules for data used in a computer application, comprising:
   means for establishing a set of business rules, each of the rules including a trigger condition and a process, and each of the rules determining the validity of data used in an associated, defined computer application;
   a table, external of the computer application, for storing the rules;
   means for performing predefined operations on the data;
   means for checking all the rules in the table to determine if any are invoked by the predefined operation;
   means for determining, for each rule that is invoked, whether the trigger condition of the rule is satisfied; and
   means for implementing the process of each rule, the trigger condition of which is satisfied, while the rule is stored in said external table to determine if data used in the computer application are valid.

9. A system according to claim 8, further comprising:
   means for running an application using the data; and
   means for changing any of the business rules without recompiling or reinstalling the application.

10. A program storage device readable by machine, tangibly embodying a program of instructions executable by the machine to perform method steps for managing business rules for data used in a computer application, said method steps comprising:
    establishing a set of business rules, each of the rules including a trigger condition and a process, and each of the rules determining the validity of data in an associated, defined computer application;
    storing the rules in a table external of the computer application;
    performing a predefined operation on the data;
    checking all the rules in the table to determine if any are invoked by the predefined operation;
    for each rule that is invoked, determining whether the trigger condition of the rule is satisfied; and
    for each rule the trigger condition of which is satisfied, implementing the process of the rule while the rule is stored in said external table to determine if data used in the computer application are valid.

11. A program storage device according to claim 10, wherein said method steps further comprise:
    running an application using the data; and
    changing any of the business rules without recompiling or reinstalling the application.

12. A method according to claim 4, wherein each rule specifies the conditions under which the rule is invoked.

13. A method according to claim 4, comprising the further step of changing the business rules, wherein said changing does not require any changes to the associated application.

14. A method according to claim 4, comprising the further steps of:
    providing a list of subtriggers; and
    creating the trigger for each rule from the list of subtriggers.

* * * * *